(12) United States Patent
Thacker et al.

(10) Patent No.: US 10,983,090 B2
(45) Date of Patent: Apr. 20, 2021

(54) ELECTROPHORESIS GEL WITH EXTENDED SHELF LIFE AND HIGH PERFORMANCE

(71) Applicant: LIFE TECHNOLOGIES CORPORATION, Carlsbad, CA (US)

(72) Inventors: Michael Thacker, San Diego, CA (US); Jennifer Miller, Oceanside, CA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 84 days.

(21) Appl. No.: 15/294,625

(22) Filed: Oct. 14, 2016

(65) Prior Publication Data

US 2017/0108466 A1 Apr. 20, 2017

Related U.S. Application Data

(60) Provisional application No. 62/241,642, filed on Oct. 14, 2015.

(51) Int. Cl.
*G01N 27/447* (2006.01)

(52) U.S. Cl.
CPC .............................. *G01N 27/44747* (2013.01)

(58) Field of Classification Search
CPC ........................................ G01N 27/447–44747
See application file for complete search history.

(56) References Cited

U.S. PATENT DOCUMENTS

| | | | |
|---|---|---|---|
| 6,726,821 B1 | 4/2004 | Suzuki | |
| 6,733,647 B2 | 5/2004 | Chan et al. | |
| 8,282,800 B2 | 10/2012 | Rowell et al. | |
| 8,506,781 B2 | 8/2013 | Rowell et al. | |
| 2010/0051462 A1 | 3/2010 | Rowell et al. | |
| 2011/0308951 A1 | 12/2011 | Ben-Asouli et al. | |
| 2014/0262785 A1 | 9/2014 | Li et al. | |

FOREIGN PATENT DOCUMENTS

| | | | |
|---|---|---|---|
| EP | 2180316 | 4/2010 | |
| EP | 2183583 | 6/2011 | |
| EP | 1167962 | 1/2014 | |
| JP | H04184163 A | 7/1992 | |
| JP | 2001159621 A | 6/2001 | |
| JP | 2002277438 A | 9/2002 | |
| JP | 2005351765 A | 12/2005 | |
| JP | 2013502599 A | 1/2013 | |
| JP | 2013125014 A * | 6/2013 | ....... G01N 27/44747 |
| WO | 2002016640 | 2/2002 | |
| WO | 2013061117 | 5/2013 | |
| WO | 2014262785 | 9/2014 | |

* cited by examiner

*Primary Examiner* — J. Christopher Ball

(57) ABSTRACT

An electrophoresis gel with a gel buffer that includes a gel amine buffer, a primary gel ampholyte, and a conjugate gel ampholyte is disclosed herein. The conjugate gel ampholyte may be selected from threonine and serine.

24 Claims, 22 Drawing Sheets

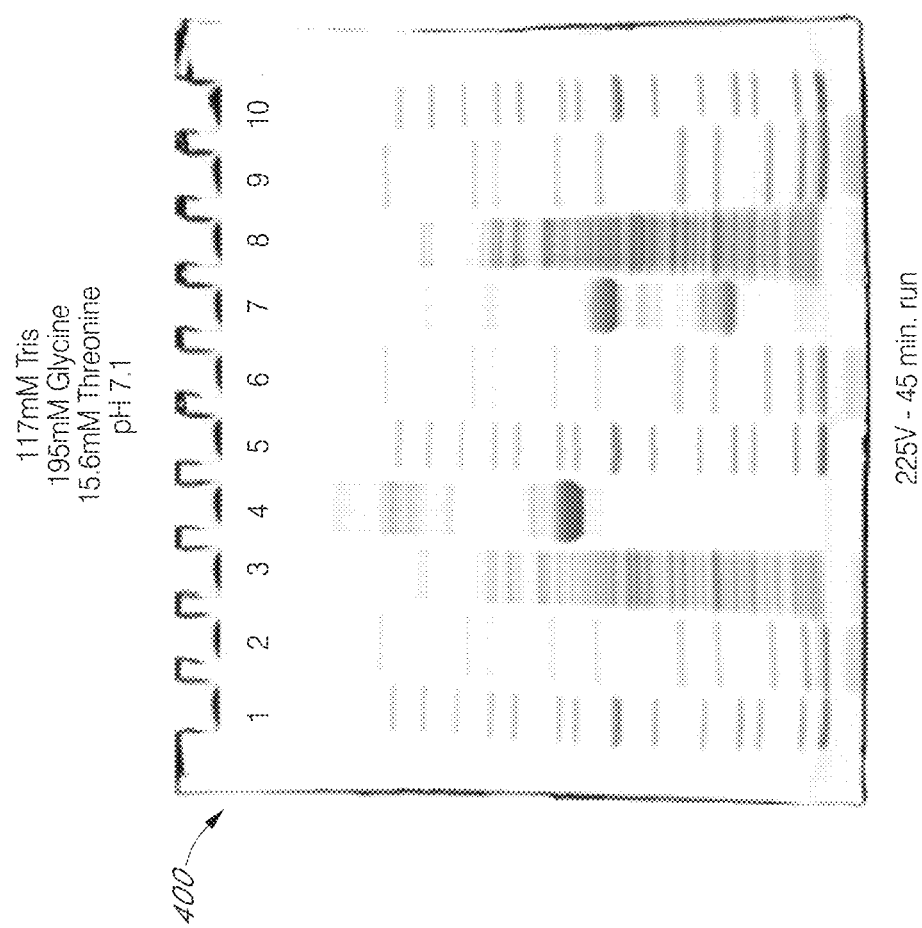

ELECTROPHORESIS GEL WITH EXTENDED SHELF LIFE AND HIGH PERFORMANCE

CROSS REFERENCE TO RELATED APPLICATIONS

This application claims the right of priority under 35 U.S.C. § 119(e) to U.S. Provisional Appl. No. 62/241,642, filed Oct. 14, 2015, which is commonly owned this with application and which is hereby expressly incorporated by reference in its entirety as though fully set forth herein.

TECHNICAL FIELD

The present disclosure relates to formulations, systems, and techniques for use in gel electrophoresis. More particularly, the present disclosure relates to formulations of polyacrylamide gels exhibiting approximately neutral pH, and related systems and methods.

BACKGROUND

Gel electrophoresis is a common procedure for the separation of biological molecules, such as deoxyribonucleic acid (DNA), ribonucleic acid (RNA), polypeptides, and proteins. In gel electrophoresis, the macromolecules are separated into bands according to the rate at which an imposed electric field causes them to migrate through a filtering gel.

An apparatus used in this technique can include a gel enclosed in a glass tube or sandwiched as a slab between glass or plastic plates, sometimes referred to as a gel cassette. The gel has an open molecular network structure defining pores which are saturated with an electrically conductive buffered solution of a salt. These pores through the gel are large enough to admit passage of the migrating macromolecules.

The gel cassette or other apparatus is placed in a chamber in contact with buffer solutions which provide electrical contact between the gel and the cathode or anode of an electrical power supply. A sample containing the macromolecules and a tracking dye is placed on top of the gel. An electric potential is applied to the gel causing the sample macromolecules and tracking dye to migrate toward the bottom of the gel. The electrophoresis is halted just before the tracking dye reaches the end of the gel. The locations of the bands of separated macromolecules are then determined. By comparing the distance moved by particular bands in comparison to the tracking dye and macromolecules of known size, the size of other macromolecules can be determined.

The rate of migration of macromolecules through the gel depends upon four principle factors: the support matrix (i.e., the porosity of the gel); the size and shape of the macromolecule; the charge density of the macromolecule; and the applied field strength. Electrophoresis systems generally attempt to control these factors in order to be reproducible from gel to gel and from sample to sample. However, maintaining uniformity between gels is difficult because each of these factors is sensitive to many variables in the chemistry of the gel system.

The two types of support matrices commonly used in electrophoresis are polyacrylamide and agarose. The support matrices act as porous media and behave like a molecular sieve. Agarose has a relatively large pore size and is generally used for separating nucleic acids and protein complexes. Polyacrylamide has a relatively smaller pore size and is generally used for separating most proteins and smaller nucleic acids.

Polyacrylamide gels are generated by the polymerization of acrylamide monomers. These monomers are crosslinked into long chains by the addition of bifunctional compounds such as N,N-methylenebisacrylamide ("bisacrylamide"), which react with free functional groups of the chain termini. The total combined concentration of acrylamide and bisacrylamide (expressed at % T=X %, where X is the total acrylamide concentration in the gel) affects the pore size of the gel. For instance, for a given crosslinker concentration (% C), an increased acrylamide concentration (% T) provides a decreased pore size, which results in resolution of lower molecular weight molecules and vice versa. Polyacrylamide gel electrophoresis (PAGE) provides desirable electrophoresis characteristics because the gels are optically transparent, electrically neutral, and can be made with a range of pore sizes.

Electrophoresis can be performed under denaturing conditions using an anionic detergent, such as sodium dodecyl sulfate (SDS), for example. When polyacrylamide gel electrophoresis is used with sodium dodecyl sulfate, i.e. as SDS-PAGE, the charge density of the macromolecules is controlled by adding SDS to the system. SDS molecules associate with the macromolecules and impart a uniform charge density to them, substantially negating the effects of any innate molecular charge. The resultant SDS-macromolecule complexes are highly negatively charged and are resolved in the gel based on their size.

Historically, SDS-PAGE gels were usually poured and run at basic pH. The most common PAGE buffer system employed for the separation of proteins is that developed by Ornstein and Davis (Ornstein, L. (1964) *Ann. NY Acad. Sci.*, 121:321 and Davis, B. J. (1964) *Ann. NY Acad. Sci.*, 121:404), and modified for use with SDS by Laemmli (Laemmli, 1970, *Nature*, 227, 680-686). The Laemmli buffer system consists of 0.375 M tris (hydroxymethyl) aminomethane ("Tris"), titrated to pH 8.8 with HCl, in the separating gel. The stacking gel consists of 0.125 M Tris, titrated to pH 6.8. The anode and cathode running buffers contain 0.024 M Tris, 0.192 M glycine, 0.1% SDS (i.e. as a "Tris-glycine buffer").

Although various buffer systems have been developed, Tris-glycine is relatively inexpensive, offers familiarity to industry practitioners due to its widespread use, and provides macromolecule bands and lane shapes that have a qualitative difference. Moreover, downstream applications, such as silver staining, are compatible with Tris-glycine buffer systems. With respect to silver staining, Tris-glycine gels have been reported to provide lower background staining than gels buffered with Tricine or Bicine (Rabilloud, T., et al., *Cell Mol. Biol.*, 40:57-75 (1994)).

A drawback to the use of polyacrylamide gels with traditional (e.g., Tris-glycine) buffers that have basic pH values as discussed above is that the gels tend to hydrolyze over time to a polyacrylate anion and ammonium cation. The negative charge of the polyacrylate anion interferes with proper migration of the macromolecules (e.g., negatively charged proteins of a sample) wherein the migration distance of the macromolecules in the gel is reduced. This migration interference can cause undesirable "smiling effects," in which low molecular weight protein bands near gel edges tend to curve upward, making accurate determination of separation difficult. Hydrolysis also can lower the resolution of the macromolecule bands. Gels with high pH buffers that are not refrigerated can degrade in a matter of days due to hydrolysis. However, even refrigerated gels of this type kept at temperatures on the order of 4° C. can start to deteriorate within two to three months of manufacture.

Therefore, a need exists for an electrophoresis gel buffer formulation that has a neutral pH, thereby providing polyacrylamide gels with an extended shelf life. Moreover, a need exists for such a formulation which can provide effective separation of macromolecules during electrophoresis such that the sharpness in the resolution of the separated molecules is maintained at an acceptable level, and that exhibits a relatively large buffering capacity. A need also exists for an electrophoresis gel buffer that is compatible with economical Tris-glycine running and sample buffers, and such running and sample buffers with which the industry has some level of familiarity. Further, a need exists for such a neutral pH buffer formulation that has compatibility with downstream applications common to Tris-Glycine gels.

SUMMARY

Disclosed herein are gel compositions and gel buffers which address one or more of the problems identified above. A polyacrylamide gel for gel electrophoresis in accordance with various exemplary embodiments of the present disclosure has a gel buffer that includes a gel amine buffer, a primary gel ampholyte, and a conjugate gel ampholyte that may be selected from threonine and serine.

In accordance with another aspect of the present disclosure, a method for separating molecules in a sample by electrophoresis is disclosed. The method can include the steps of forming a polyacrylamide gel, loading the polyacrylamide gel with the sample, and imposing a voltage differential across the gel to cause the molecules to migrate through said gel at migration rates that vary with mass and/or charge. The polyacrylamide gel of a method for separating molecules in a sample by electrophoresis as disclosed herein may include a gel amine buffer, a primary gel ampholyte, and a conjugate gel ampholyte. The conjugate gel ampholyte may be selected from threonine and serine.

In accordance with a further aspect of the present disclosure, a polyacrylamide gel buffer includes a gel amine buffer, a primary gel ampholyte, and a conjugate gel ampholyte that is selected from threonine and serine. The pH of the gel buffer can range from about 6.5 to about 7.5.

Additional objects and advantages will be set forth in part in the description which follows, and in part will be obvious from the description, or may be learned by practice of the present teachings. The objects and advantages of the present disclosure will be realized and attained by means of the elements and combinations particularly pointed out in the appended claims, and their equivalents.

It is to be understood that both the foregoing general description and the following detailed description are exemplary and explanatory only and are not restrictive of the claimed subject matter. The accompanying drawings, which are incorporated in and constitute part of this specification, illustrate exemplary embodiments of the present disclosure and together with the description, serve to explain various principles of the present disclosure.

BRIEF DESCRIPTION OF THE DRAWINGS

At least some features and advantages of the present disclosure will be apparent from the following detailed description of exemplary embodiments consistent therewith, which description should be considered with reference to the accompanying drawings, wherein:

FIG. 4A shows an annotated grayscale photograph of an exemplary embodiment of a gradient polyacrylamide gel (T=8-16%), having a pH of 7.1 and having a polyacrylamide gel formulation including 117 mM Tris, 195 mM glycine, and 15.6 mM threonine, taken after the gel was used to perform an electrophoresis separation;

Figure 1A:
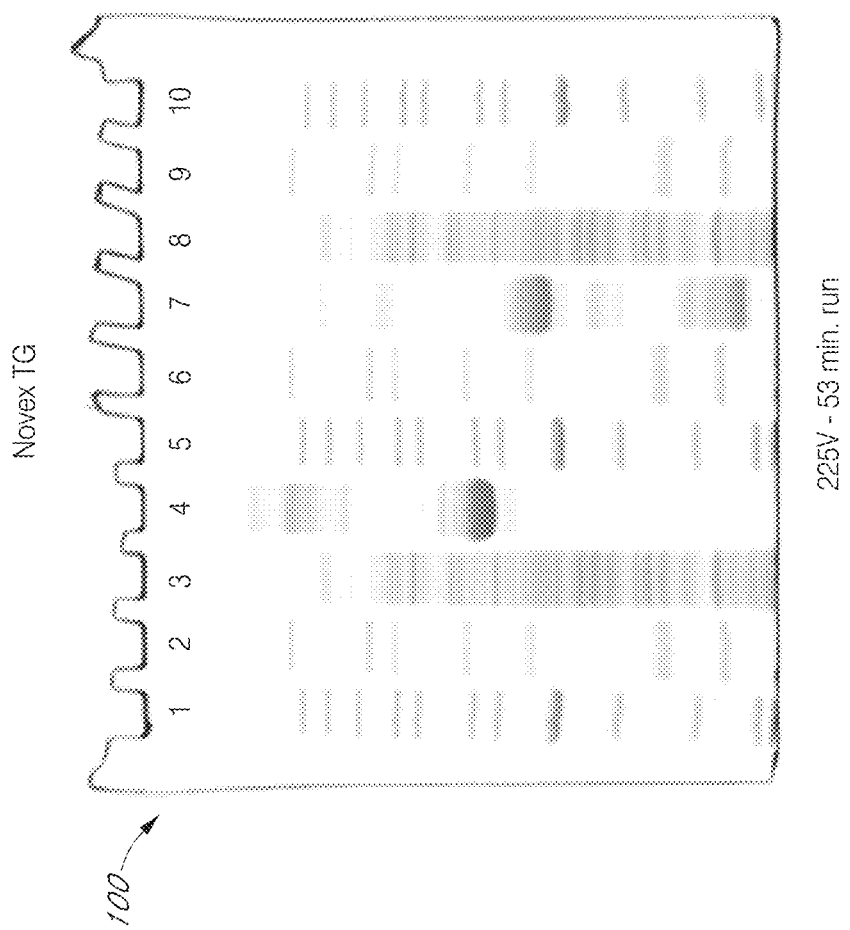
FIG. 1A shows an annotated grayscale photograph of a commercially available non-gradient polyacrylamide gel, namely Novex™ Tris-Glycine polyacrylamide gel (% T=10%) (of Thermo Fisher Scientific, Inc.), having a control polyacrylamide gel formulation with a pH of 8.7 and including 400 mM Tris and 0 mM glycine, taken after the gel was used to perform an electrophoresis separation.

Although the following detailed description makes reference to exemplary illustrative embodiments, many alternatives, modifications, and variations thereof will be apparent to those skilled in the art. Accordingly, it is intended that the claimed subject matter be viewed broadly.

DESCRIPTION OF EXEMPLARY EMBODIMENTS

The terms used throughout this specification generally have their ordinary meanings in the art, within the context of the invention, and in the specific context where each term is used. Certain terms are discussed below, or elsewhere in the specification, to provide additional guidance to the practitioner in describing the formulations, systems, and methods of the present disclosure and how to make and use them. It will be appreciated that the same thing can be said in more than one way. Consequently, alternative language and synonyms may be used for any one or more of the terms discussed herein, nor is any special significance to be placed upon whether or not a term is elaborated or discussed in greater detail herein. Synonyms for certain terms are provided. A recital of one or more synonyms does not preclude the use of other synonyms. The use of examples anywhere in this specification, including examples of any terms discussed herein, is illustrative only, and in no way limits the scope and meaning of any of the embodiments set forth herein or of any exemplified term.

As used herein, the term "discontinuous buffer", "discontinuous system" and "discontinuous buffer system" generally refer to one of two aqueous buffering systems used in polyacrylamide gel electrophoresis systems. A discontinuous buffer system is functionally and chemically distinguished from a continuous buffer system. Typically, a continuous system has only a single separating gel and uses the same buffer in the tanks and the gel. In a discontinuous system, a non-restrictive large pore gel, called a stacking gel, is often layered on top of a separating gel (sometimes referred to as a "resolving gel"). Each gel may be made with the same, or different, buffer, and the tank buffers are different from the gel buffers. The discontinuity is created by the difference in ion mobility of the faster moving leading ion (for example, chloride) and the slower moving trailing ion(s) (glycine, threonine, and/or serine). The resolution obtained in a discontinuous system is much greater than that obtained with a continuous system for samples that contain dilute solutions of analytes due to the concentrating effect of discontinuous systems to create sharp starting zones of analyte molecules. The difference between a continuous buffer system and a discontinuous buffer system is well known to those skilled in the art to which the present invention pertains.

The term "band sharpness" is a relative term that is used to compare the sharpness of migrated bands as they appear on various gel formulations. The term is used particularly when comparing relative band sharpness between two or more of various gel formulations. A variety of methods may be used to determine band sharpness. For example, depending on the degree of resolution that is obtained, band sharpness, or the degree to which band sharpness is improved, may be determined by visual inspection. To obtain a more quantitative estimation of band sharpness, a gel imaging and analysis software may be employed. An exemplary, though non-limiting, gel imaging and analysis software typically used in the art is, e.g., TOTALLAB™ software (Nonlinear Dynamics Ltd, Durham, N.C.), GEL-PRO™ Analyzer (Media Cybernetics, Bethesda, Md.) or LABIMAGE® 1D L300 Gel Analysis software (LabImage, Leipzig, Germany). Band sharpness may be determined by measuring the area of each resolved band in a gel, and dividing the area by the width of each well (which is generally constant). Another method of determining band sharpness may be to directly measure the width of individual peaks detected by the gel image and analysis software. Sharper bands increase the likelihood of detecting a protein of interest because protein mass is distributed over a smaller area.

In an exemplary embodiment, the present disclosure contemplates an electrophoretic system that includes a gel and buffer system wherein separation occurs at approximately neutral pH. As used herein, an approximately neutral pH may generally be a pH ranging from about 6.5 to about 7.5, for example, a pH ranging from about 6.9 to about 7.5, or, for example, a pH ranging from about 7.0 to about 7.2. Without being bound by any particular theory or mechanism, it is believe that the use of an approximately neutral pH electrophoretic system ensures that biological molecules within a sample being subjected to electrophoresis (e.g., proteins, nucleic acids, carbohydrates and the like) remain completely or substantially reduced and unhydrolyzed. Advantageously, at approximately neutral pH, primary amino groups of proteins are less reactive with unpolymerized acrylamide, thereby allowing greater resolution and improved band sharpness. Additionally, thiol groups are less susceptible to oxidation than under the more alkaline conditions under which SDS-PAGE is conventionally performed.

Gels that have a uniform acrylamide concentration, generally expressed as a percentage, are referred to as non-gradient gels. In a non-gradient gel, the uniform acrylamide concentration provides a uniform molecular sieve across the entirety of the gel. Alternatively, gels that have a non-uniform acrylamide concentration across a length of the gel are referred to as gradient gels. Generally, in a gradient gel, the acrylamide concentration increases gradually or stepwise along a downward length of the gel. Thus, in a gradient gel, the graduated acrylamide concentration provides an increasingly dense molecular sieve across the entirety of the gel, thereby offering separation of larger range of macromolecules within the gel than a same-sized non-gradient gel could provide.

A gel may or may not include a stacking portion. A gel without a stacking portion is a gel that has been formed from a single acrylamide solution in the entire electrophoresis gel apparatus, e.g., gel cassette, whereas a gel with a stacking portion is formed from at least two acrylamide solutions: (1) a small, low-concentration stacking gel where the macromolecule wells reside, and (2) a larger portion of the gel wherein protein separation occurs. In the traditional Tris-glycine electrophoresis gel system, the macromolecules are stacked in the stacking gel between the highly mobile leading chloride ions (in the gel buffer) and the slower trailing glycine ions (in the running buffer). A reason for using the stacking gel is to improve the resolution of the bands in the gel. The stacked macromolecule bands undergo sieving once they reach the separating gel. The separating gel may be a non-gradient gel or a gradient gel, as described above.

The gel formulations that form the basis of the present disclosure may, in some embodiments, offer desirable performance characteristics when used as part of a discontinuous buffer system. A discontinuous buffer system is one using a different aqueous buffer in the anode chamber, the cathode chamber, or both the anode and the cathode chambers from the buffer present in the gel. The concentration of the aqueous running buffer may differ from the buffer concentration of the electrophoresis gel. In some embodiments, a gel formulation in accordance with the present disclosure may include a stacking gel and a resolving gel.

In some embodiments, a gel formulation may include a stacking gel and a resolving gel (i.e., separating gel). Non-limiting examples of a stacking gel to resolving gel ratio (also denoted as S:R) may be about 0.5:9.5, about 1:9, about 1.5:8.5, about 2:8, about 2.5:7.5, about 3:7, about 3.5:6.5, about 4:6, about 4.5:5.5, or about 1:1. Generally, the ratio of stacking to resolving gel can be varied depending on various factors, such as, for example, separation and sample requirements. The meaning of the term stacking and resolving gel, when used in the context of a discontinuous gel electrophoresis system, is well known to persons having ordinary skill in the art. Typically, the percentage of polyacrylamide and/or cross linker (e.g., bisacrylamide) that is present in a stacking gel may be less than the percentage of polyacrylamide and/or cross linker that is present in a resolving gel. In some embodiments, the percentage of polyacrylamide that is present in a stacking gel will be less than about 6%, less than about 5%, less than about 4%, less than about 3%. In some embodiments, the percentage of polyacrylamide that is present in a stacking gel can be about 2.5% or less.

In one embodiment of an electrophoretic system and formulation, a resolving polyacrylamide gel ranging from about 2.5% to about 25% acrylamide (% T) is polymerized using from about 1% to about 6% of a suitable crosslinker (% C), such as, for example, bisacrylamide. In an embodiment, the gel is polymerized using from about 2% to about 5% crosslinker (% C) in the presence of a gel buffer. In an embodiment, a polyacrylamide gel may include 25% acrylamide, 24% acrylamide, 23% acrylamide, 22% acrylamide, 21% acrylamide, 20% acrylamide, 19% acrylamide, 18% acrylamide, 17% acrylamide, 16% acrylamide, 15% acrylamide, 14% acrylamide, 13% acrylamide, 12% acrylamide, 11% acrylamide, 10% acrylamide, 9% acrylamide, 8% acrylamide, 7% acrylamide, 6% acrylamide, 5% acrylamide, 4% acrylamide, 3% acrylamide, or 2.5% acrylamide.

In certain non-limiting embodiments, the SDS may be substantially absent from the electrophoresis gel formulation. Instead, the SDS may be provided in the running buffer and/or the loading buffer.

A polyacrylamide gel in accordance with the various exemplary embodiments may include primary organic amine or mono- or di-substituted amine buffers. The pKa range of the gel amine buffer also can be approximately neutral, typically in the range of from about 5 to about 10, in the range of from about 5.5 to about 10, in the range of from about 6 to about 9, in the range of from about 7 to about 8.5, the range of from about 7.9 to about 8.2, or in the range of from about 8.0 to about 8.1. Exemplary, though non-limiting, gel amines buffers suitable for use with the electrophoretic systems and methods described herein may include Bis(2-hydroxyethyl)-imino-tris(hydroxymethyl)-methane (hereinafter "Bis-Tris"), 1,3-bis(tris(hydroxymethyl)methylamino)propane (hereinafter "Bis-Tris propane"), tris(hydroxymethyl)aminomethane (hereinafter "Tris"), triethanolamine, or any derivatives or salts thereof having a pKa value in the range of from about 5.5 to about 10.0. However, any gel amine buffer having at least one primary amine or substituted amine and further having a pKa in the range of from about 7.9 to about 9.8 may be used during the practice of the presently described embodiments, without departing from the spirit and scope thereof.

In some embodiments, the concentration of gel amine buffer present in the gel may be less than about 150 mM, for example, in the range of from about 40 mM to about 150 mM, or from about 70 mM to about 140 mM. Lower concentration levels of gel amine buffer, for example, about 80 mM or less, may be generally more applicable to non-gradient gels. Higher concentration levels of gel amine buffer, for example, about 80 mM or more, may be generally more applicable to gradient gels. In some embodiments a gel has a gel amine buffer at a concentration of less than 150 mM and the gel amine buffer is Tris. Generally, gel formulations having a lower Tris concentration, for example, below 150 mM, can provide reduced electrophoresis separation run times and reduced heat produced during electrophoresis.

In various exemplary embodiments, the gel amine buffer may be added directly to the resolving gel, to the stacking gel, or to both the resolving gel and the stacking gel as an aqueous solution, at the time the other aqueous components thereof are combined and prior to the initiation of the polymerization reaction. Alternatively, the gel amine buffer may be incorporated into the gel matrix, for example, by soaking the polymerized gel in an aqueous solution containing the desired concentration of gel amine buffer and allowing the gel amine buffer to permeate the polymerized gel matrix.

A polyacrylamide gel that forms the basis of an electrophoretic system may include a primary gel ampholyte in combination with a gel amine buffer as described above. A primary gel ampholyte suitable for use with the gel formulations in accordance with exemplary embodiments of the present disclosure may include, without limitation, any biological buffer having an amine group and which is capable of forming zwitterions in aqueous solution. In some embodiments, primary gel ampholytes that are well-suited for use with the subject gel formulation will have a pK value that is up to about 2.0 pH units larger than the pKa value of the gel amine. By way of non-limiting example, the following exemplary gel ampholytes are contemplated for use with the presently described embodiments as a primary gel ampholyte: 2-aminoacetic acid (hereinafter "glycine"), N-(Tri(hydroxymethyl)methyl)glycine (hereinafter "tricine"), N,N-Bis(2-hydroxyethyl)glycine; Diethylolglycine (hereinafter "bicine"), piperazine-N,N'-bis(2-ethanesulfonic acid) (hereinafter "PIPES"), 3-(N-Morpholino)-2-hydroxypropanesulfonic Acid (hereinafter "MOPSO"), N-(2-Acetamido)-2-aminoethanesulfonic acid (hereinafter "ACES"), N,N-Bis(2-hydroxyethyl)-2-aminoethanesulfonic acid (hereinafter "BES"), N-Tris(hydroxymethyl)methyl-2-aminoethanesulfonic acid (hereinafter "TES"), -(2-hydroxyethyl)-1-piperazineethanesulfonic acid (hereinafter "HEPES"), 2-amino-methyl-1,3-propanediol 3-[4-(2-Hydroxyethyl)-1-piperazinyl]propanesulfonic acid (hereinafter "HEPPS"), and N-Tris(hydroxymethyl)methyl-3-aminopropanesulfonic acid (hereinafter "TAPS"). Of course, it will be readily apparent to those skilled in the art that any gel ampholyte having at least one amine or substituted amine and further having a pKa that ranges from about 1 to about 2 pH units greater than the gel amine chosen for use in the gel may be used in the practice of the presently described embodiments, without departing from the spirit and scope thereof. A primary ampholyte may be present in a gel formulation at a concentration in the range of about 25 mM to about 250 mM, or about 100 mM to about 250 mM.

In various exemplary embodiments, a polyacrylamide gel formulation for use in an electrophoretic system may include a conjugate gel ampholyte in combination with the gel amine and primary gel ampholyte described above. By way of non-limiting example, the following exemplary conjugate gel ampholytes are contemplated for use with the presently described embodiments: (2S,3R)-2-amino-3-hydroxybutanoic acid (hereinafter "threonine"), (2S)-2-amino-3-hydroxypropanoic acid (hereinafter "serine"), 2-aminoethanesulfonic acid (hereinafter "taurine"), and (2S)-2,4-diamino-4-oxobutanoic acid (hereinafter "asparagine"). A conjugate ampholyte may be present in a gel formulation at a concentration in the range of from about 0.1 mM to about 200 mM, in the range of from about 0.1 mM to about 50 mM or in the range of from about 10 mM to about 50 mM. In some exemplary embodiments, the gel amine buffer acts as a base and a buffering agent, the primary ampholyte acts as a trailing ion, and the conjugate ampholyte acts as an additional trailing ion. The primary ampholyte is a leading trailing ion, trailing behind the Cl ion provided by the HCl, with the additional trailing ion following. With regard to identifying a particular conjugate ampholyte to be used in the buffer formulations within the scope of this disclosure, threonine and serine unexpectedly provided qualitatively superior protein band separation and resolution.

In some embodiments, the gel ampholyte(s) may be added directly to the resolving gel, to the stacking gel, or to both the resolving gel and the stacking gel as an aqueous solution, for example, at the time the other aqueous components thereof are combined and prior to the initiation of the polymerization reaction. Alternatively, the gel ampholyte(s) may be incorporated into the gel matrix by soaking the polymerized gel in an aqueous solution containing the desired concentration of gel ampholyte(s) and allowing the gel ampholyte(s) to permeate the polymerized gel matrix.

In one non-limiting exemplary embodiment, the gel amine buffer may be Tris, the primary ampholyte/trailing ion may be glycine, and the conjugate ampholyte/secondary trailing ion may be threonine. In another non-limiting exemplary embodiment, the gel amine buffer may be Tris, the primary ampholyte/trailing ion may be glycine, and the conjugate ampholyte/secondary trailing ion may be serine.

The concentration of Tris in these formulations may be less than about 150 mM, for example ranging from about 70 mM to about 140 mM, the glycine may range from about 100 mM to about 250 mM, and the threonine or serine may range from about 10 mM to about 50 mM. The pH of these formulations may range from about 6.5 to about 7.5, may range from about 6.9 to about 7.5, or range from about 7.0 to about 7.2, or the pH of these formulations may be about 7.1.

The following examples are included to demonstrate various effective formulations in accordance with exemplary embodiments of the disclosure. However, those of skill in the art should, in light of the present disclosure, appreciate that one or more changes can be made in the specific embodiments which are disclosed and still obtain a like or similar result without departing from the spirit and scope of the embodiments set forth herein.

Example 1

This example illustrates the performance of polyacrylamide gels, each having been prepared with a different Tris-based gel buffer within the scope of this disclosure. The gel of FIG. 1A is a control gel 100, namely a commercially available Novex™ Tris-Glycine polyacrylamide gel (% T=10%) (by Thermo Fisher Scientific, Inc.), that includes a gel buffer formulation of 400 mM and 0 mM glycine, and has a pH of 8.7. A series of polyacrylamide gel formulations 101-107, shown individually in FIGS. 1B-1H, respectively, were cast in slab gel electrophoresis cassettes using 10% aqueous acrylamide/bisacrylamide solution (% T=10%) for the resolving gel portion, of which the bisacrylamide constituted 2.6% of the monomer mixture (% C=2.6%). The gels produced were 1 mm thick and about 8 cm long and about 8 cm wide. Each gel cassette was formed to have ten parallel lanes 1-10. The control gel 100 and each prepared gel formulation 101-107 also have a 3.3% T, 2.6% C stacking gel portion. While the gels 100-107 had various gel buffers formulations, the gel buffer used within the resolving gel portion and the stacking gel portion of each individual gel was the same.

Each gel buffer was adjusted to the pH indicated in the descriptions below with 6N HCl. A sample buffer of 63 mM Tris HCl, 10% glycerol, 2% SDS, and 0.0025% bromophenol blue, having a at a pH of 6.8, was used with each gel formulation 100-107. A running buffer consisting of 25 mM Tris, 192 mM glycine, and 0.1% SDS, having a pH of 8.3, was used with each gel formulation 100-107.

For each gel, all ten lanes 1-10 were loaded with a sample protein mixture. The sample protein mixture loaded in each respective lane was the same for the control gel 100 and each prepared gel formulation 101-107. The sample protein mixture loaded into each lane 1-10 is identified in Table 1.

TABLE 1

Identification of Sample Protein Mixtures Loaded in Lanes 1-10 for each gel in FIGS. 1A-1H.

| Lane # | Sample | Amount |
| --- | --- | --- |
| 1 | PageRuler™ | 5 µL |
| 2 | Mark12™ | 5 µL |
| 3 | E. coli | 10 µg |
| 4 | Bovine Serum Albumin | 6 µg |
| 5 | PageRuler™ | 5 µL |
| 6 | Mark12™ | 5 µL |
| 7 | Human Immunoglobulin G (IgG) | 6 µg |

TABLE 1-continued

Identification of Sample Protein Mixtures Loaded in Lanes 1-10 for each gel in FIGS. 1A-1H.

| Lane # | Sample | Amount |
| --- | --- | --- |
| 8 | E. coli | 10 µg |
| 9 | Mark12™ | 5 µL |
| 10 | PageRuler™ | 5 µL |

Electrophoresis separations were performed at a constant voltage of 225V with run times ranging from 49 minutes to 58 minutes, with the specific run time being reflected in each of FIGS. 1A-1H. The results were as follows:

The control gel formulation 100, as shown in FIG. 1A, provided an example of acceptable protein band separation and resolution to which the performance of the formed gels within the scope of the present disclosure were compared. Of note, the control gel formulation 100 has a relatively high pH of 8.7, and thus is outside a range considered as approximately neutral in accordance with the present disclosure.

Figure 1B:
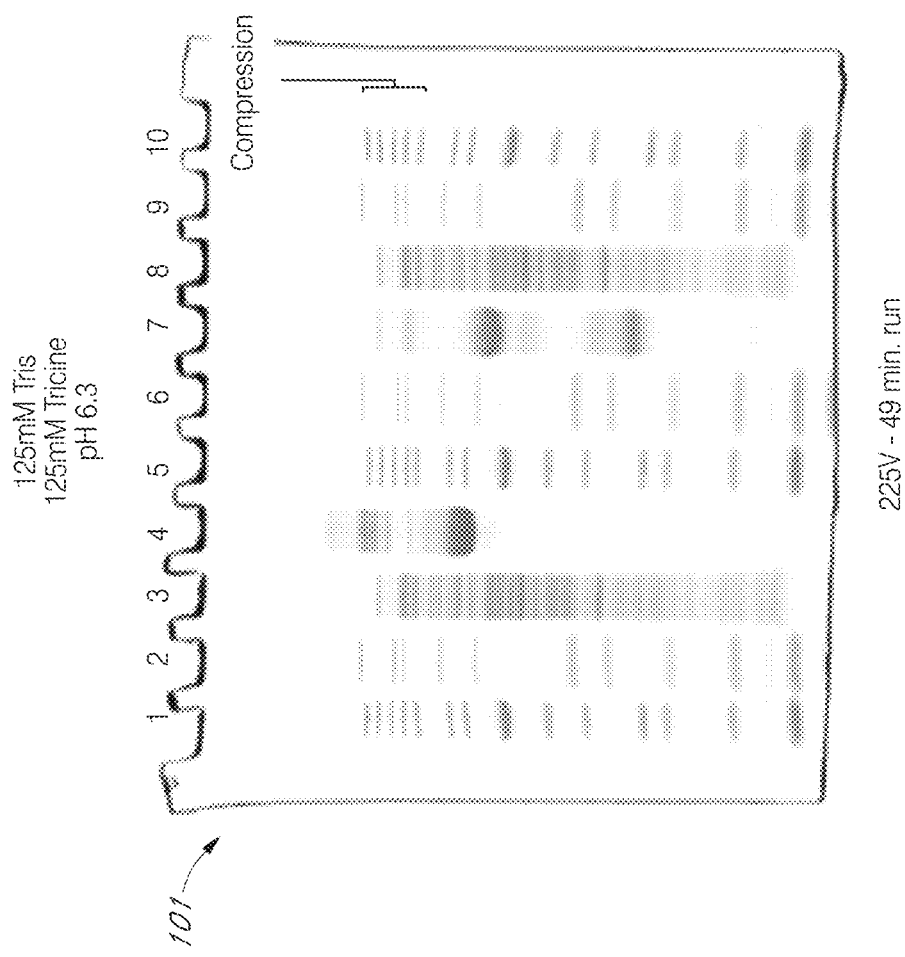
FIG. 1B shows an annotated grayscale photograph of an exemplary embodiment of a non-gradient polyacrylamide gel (% T=10%), having a polyacrylamide gel formulation with a pH of 6.3 and including 125 mM Tris and 125 mM Tricine, taken after the gel was used to perform an electrophoresis separation.
Figure 1C:
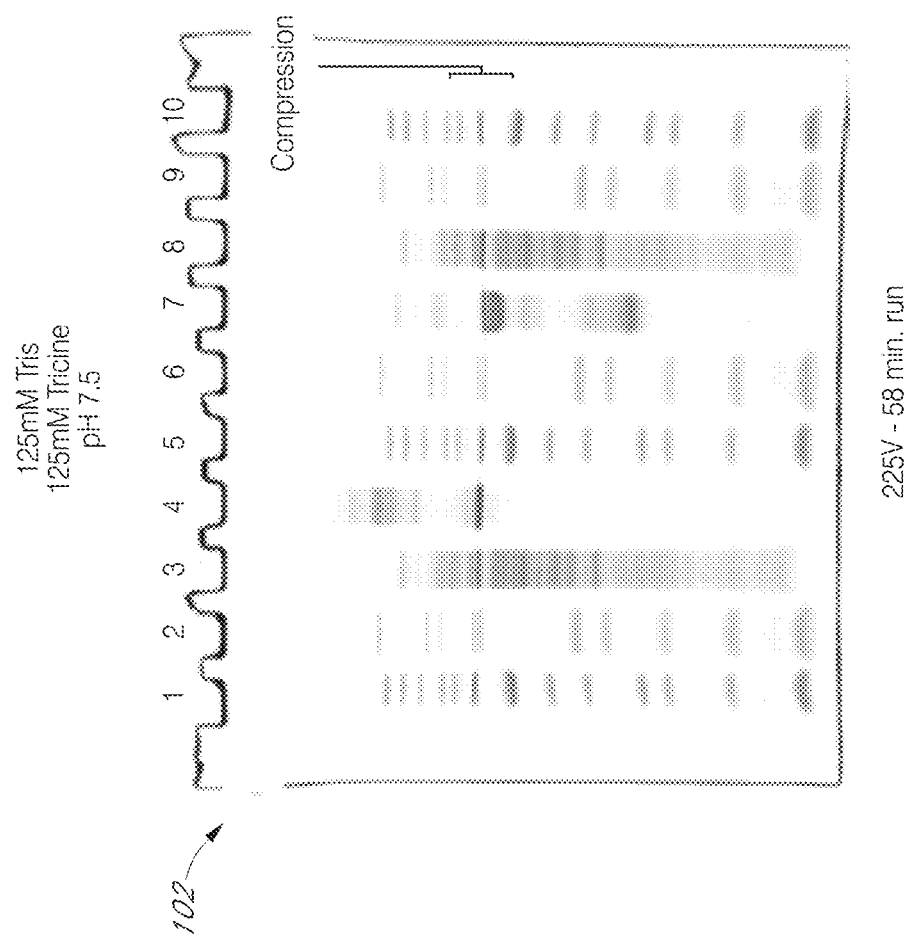
FIG. 1C shows an annotated grayscale photograph of an exemplary embodiment of a non-gradient polyacrylamide gel (% T=10%), having a polyacrylamide gel formulation with a pH of 7.5 and including 125 mM Tris and 125 mM Tricine, taken after the gel was used to perform an electrophoresis separation.

Gel formulation 101, as shown in FIG. 1B, had a pH of 6.3 and included a gel buffer of 125 mM Tris as a gel amine buffer and 125 mM tricine as a primary ampholyte. Gel 102, as shown in FIG. 1C, had a pH of 7.5 and included a gel buffer of 125 mM Tris as a gel amine buffer and 125 mM tricine as a primary ampholyte. Both gels 101 and 102 demonstrated undesirable protein separation compression, as can be seen in the identified areas of FIGS. 1B and 1C, in comparison to the same regions of FIG. 1A.

Figure 1D:
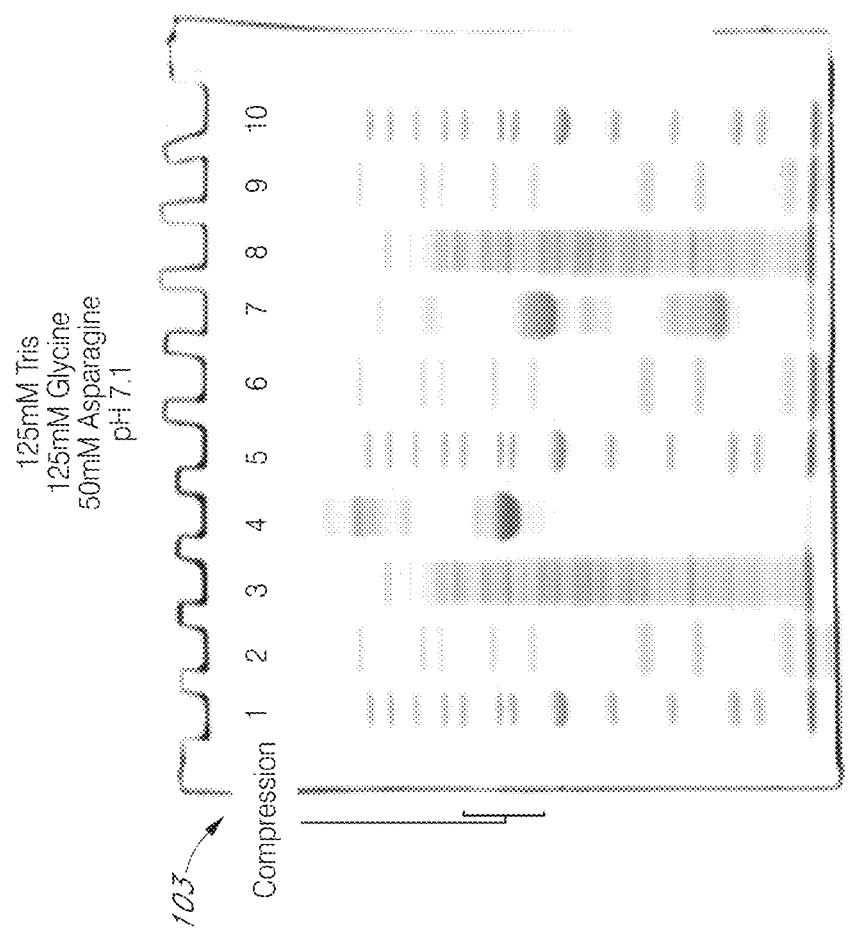
FIG. 1D shows an annotated grayscale photograph of an exemplary embodiment of a non-gradient polyacrylamide gel (% T=10%), having a pH of 7.1 and having a polyacrylamide gel formulation including 125 mM Tris, 125 mM glycine, and 50 mM asparagine, taken after the gel was used to perform an electrophoresis separation.

Gel formulation 103, as shown in FIG. 1D, had a pH of 7.1 and included a gel buffer of 125 mM Tris as a gel amine buffer, 125 mM glycine as a primary ampholyte, and 50 mM asparagine as a conjugate ampholyte. Gel 103 demonstrated undesirable protein separation compression, as can be seen in the identified areas of FIG. 1D, particularly in lanes 4, 5 and 6, in comparison to the same regions of FIG. 1A.

Figure 1E:
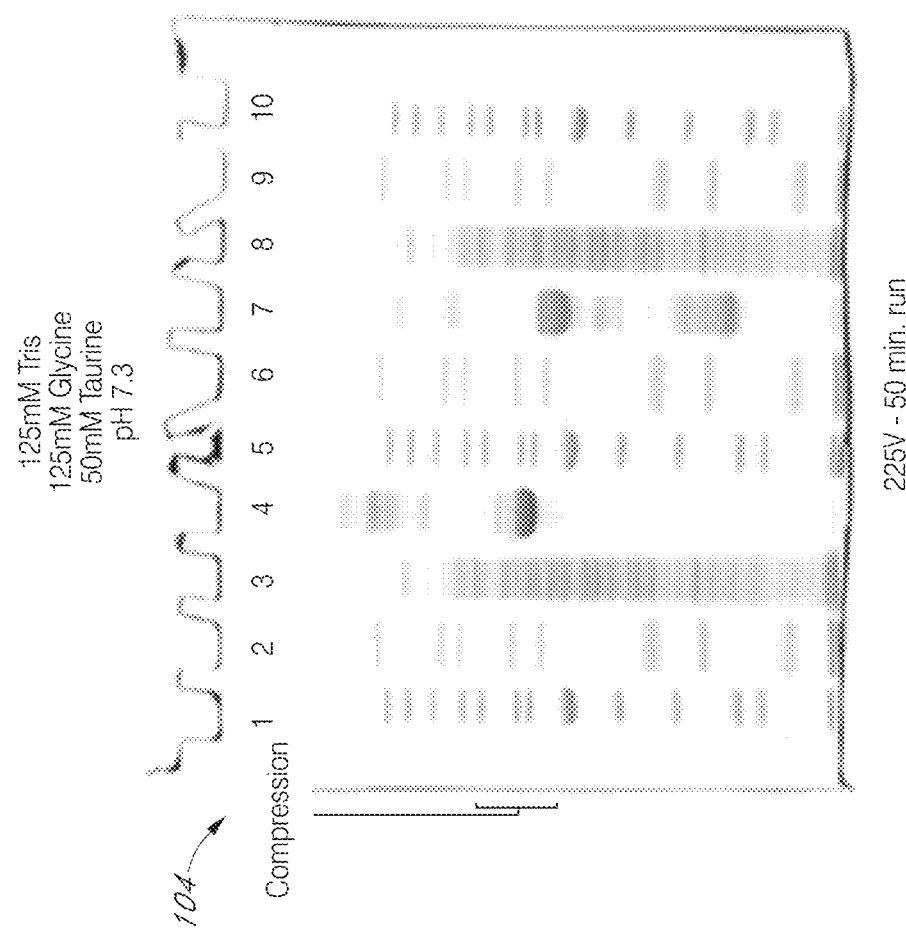
FIG. 1E shows an annotated grayscale photograph of an exemplary embodiment of a non-gradient polyacrylamide gel (% T=10%), having a pH of 7.3 and having a polyacrylamide gel formulation including 125 mM Tris, 125 mM glycine, and 50 mM taurine, taken after the gel was used to perform an electrophoresis separation.

Gel formulation 104, as shown in FIG. 1E, had a pH of 7.3 and included a gel buffer of 125 mM Tris as a gel amine buffer, 125 mM glycine as a primary ampholyte, and 50 mM taurine as a conjugate ampholyte. Gel 104 demonstrated undesirable protein separation compression, as can be seen in the identified areas of FIG. 1E, particularly in lanes 4 and 7, in comparison to the same regions of FIG. 1A.

Figure 1F:
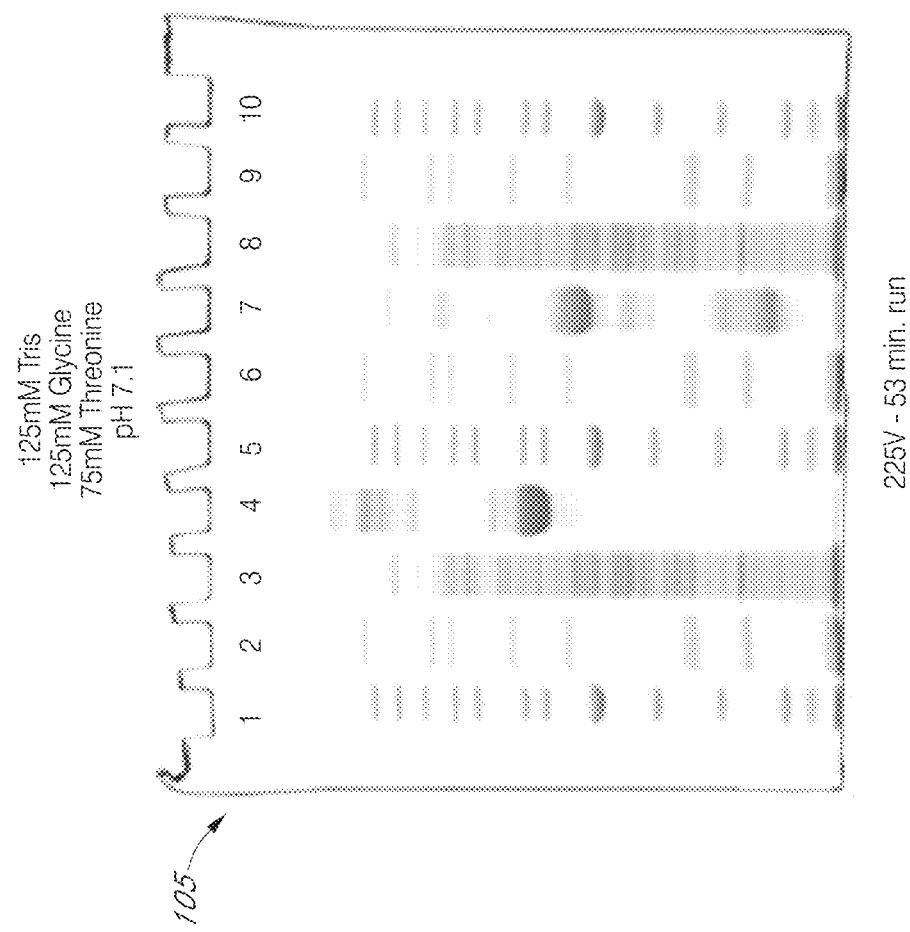
FIG. 1F shows an annotated grayscale photograph of an exemplary embodiment of a non-gradient polyacrylamide gel (% T=10%), having a pH of 7.1 and having a polyacrylamide gel formulation including 125 mM Tris, 125 mM glycine, and 75 mM threonine, taken after the gel was used to perform an electrophoresis separation.

Gel formulation 105, as shown in FIG. 1F, had a pH of 7.1 and included a gel buffer of 125 mM Tris as a gel amine buffer, 125 mM glycine as a primary ampholyte, and 75 mM threonine as a conjugate ampholyte. Gel 105 did not demonstrate undesirable protein separation compression, as can be seen in FIG. 1E when compared to FIG. 1A. Thus, based on the results obtained, this gel formulation using a Tris-glycine buffer with threonine as an additional trailing ion unexpectedly resulted in a qualitatively superior gel buffer for PAGE while also having an approximately neutral pH.

Figure 1G:
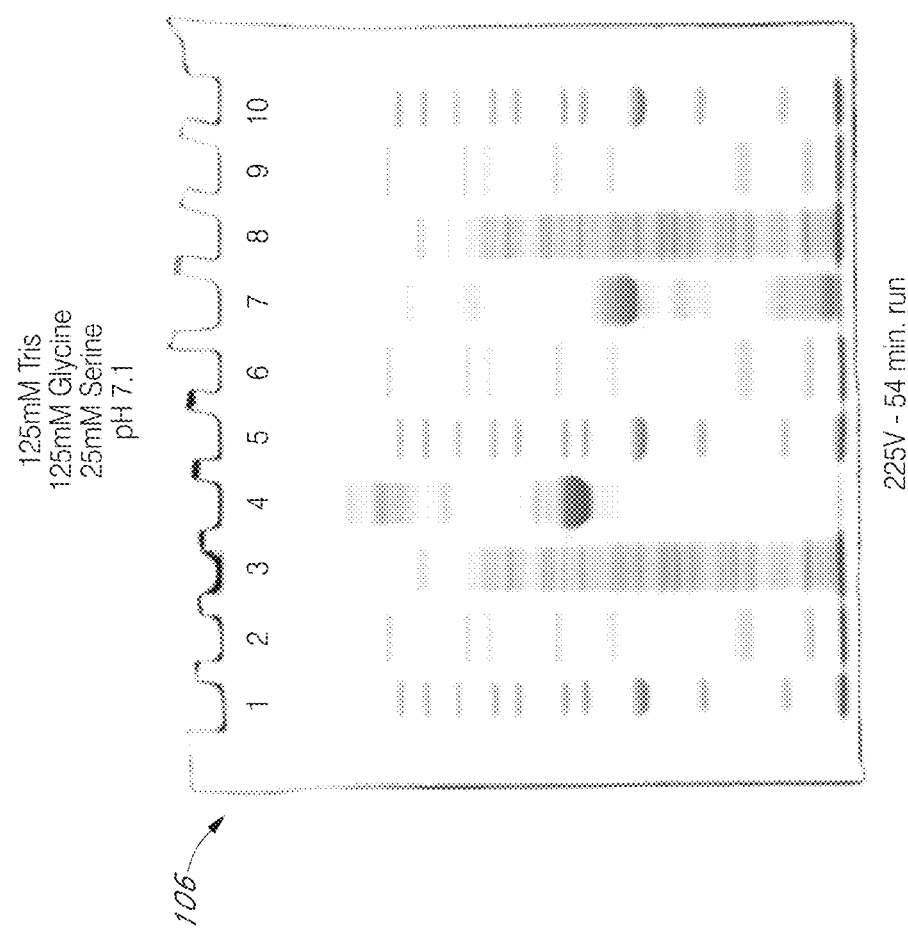
FIG. 1G shows an annotated grayscale photograph of an exemplary embodiment of a non-gradient polyacrylamide gel (% T=10%), having a pH of 7.1 and having a polyacrylamide gel formulation including 125 mM Tris, 125 mM glycine, and 25 mM serine, taken after the gel was used to perform an electrophoresis separation.
Figure 1H:
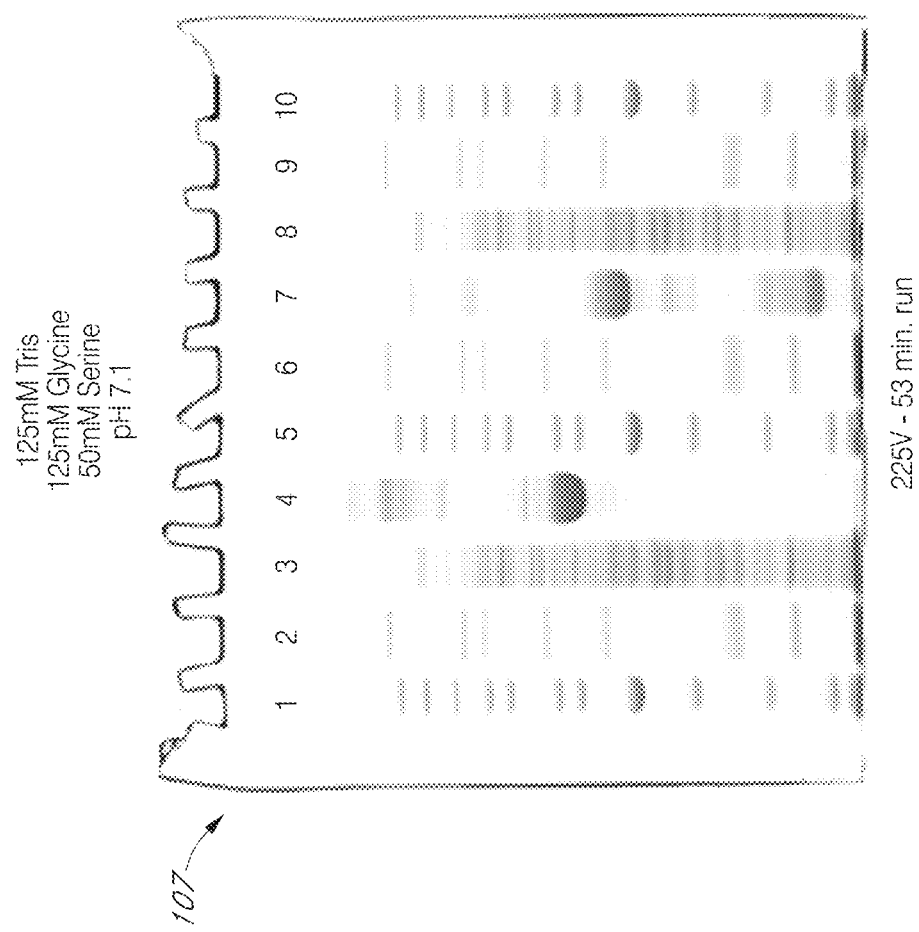
FIG. 1H shows an annotated grayscale photograph of an exemplary embodiment of a non-gradient polyacrylamide gel (% T=10%), having a pH of 7.1 and having a polyacrylamide gel formulation including 125 mM Tris, 125 mM glycine, and 50 mM serine, taken after the gel was used to perform an electrophoresis separation.

Gel formulation 106, as shown in FIG. 1G, had a pH of 7.1 and included a gel buffer of 125 mM Tris as a gel amine buffer, 125 mM glycine as a primary ampholyte, and 25 mM serine as a conjugate ampholyte. Gel formulation 107, as shown in FIG. 1H, had a pH of 7.1 and included a gel buffer of 125 mM Tris, 125 mM glycine, and 50 mM serine. Both gel formulations 106 and 107 did not demonstrate undesirable protein separation compression, as can be seen in FIGS. 1G and 1H when compared to FIG. 1A. Thus, based on the results obtained, a Tris-glycine buffer with serine substituted for threonine as the additional trailing ion also unexpectedly resulted in a qualitatively superior gel buffer for PAGE while also having an approximately neutral pH.

Example 2

This example illustrates a comparison of the performance a non-gradient polyacrylamide gel within the scope of the present disclosure with that of two commercially available non-gradient polyacrylamide gels. A polyacrylamide gel formulation 200, shown individually in FIG. 2A, was cast in slab gel electrophoresis cassettes using 10% aqueous acrylamide/bisacrylamide solution (% T=10%) for the resolving gel portion, of which the bisacrylamide constituted 2.6% of the monomer mixture (% C=2.6%). The gel produced was 1 mm thick and about 8 cm long and about 8 cm wide. Prepared gel formulation 200 additionally had a 3.3% T, 2.6% C stacking gel portion. Gel formulation 200 had a pH of 7.1 and included a gel buffer of 75 mM Tris as a gel amine buffer, 125 mM glycine as a primary ampholyte, and 10 mM threonine as a conjugate ampholyte. The gel buffer was adjusted to a pH of 7.1 with 6N HCl. A sample buffer of 63 mM Tris-HCl, 10% glycerol, 2% SDS, and 0.0025% bromophenol blue, having a at a pH of 6.8, was used with gel formulation 200. A running buffer of 25 mM Tris, 192 mM glycine, and 0.1% SDS, having a pH of 8.3, was used with gel formulation 200.

Figure 2A:
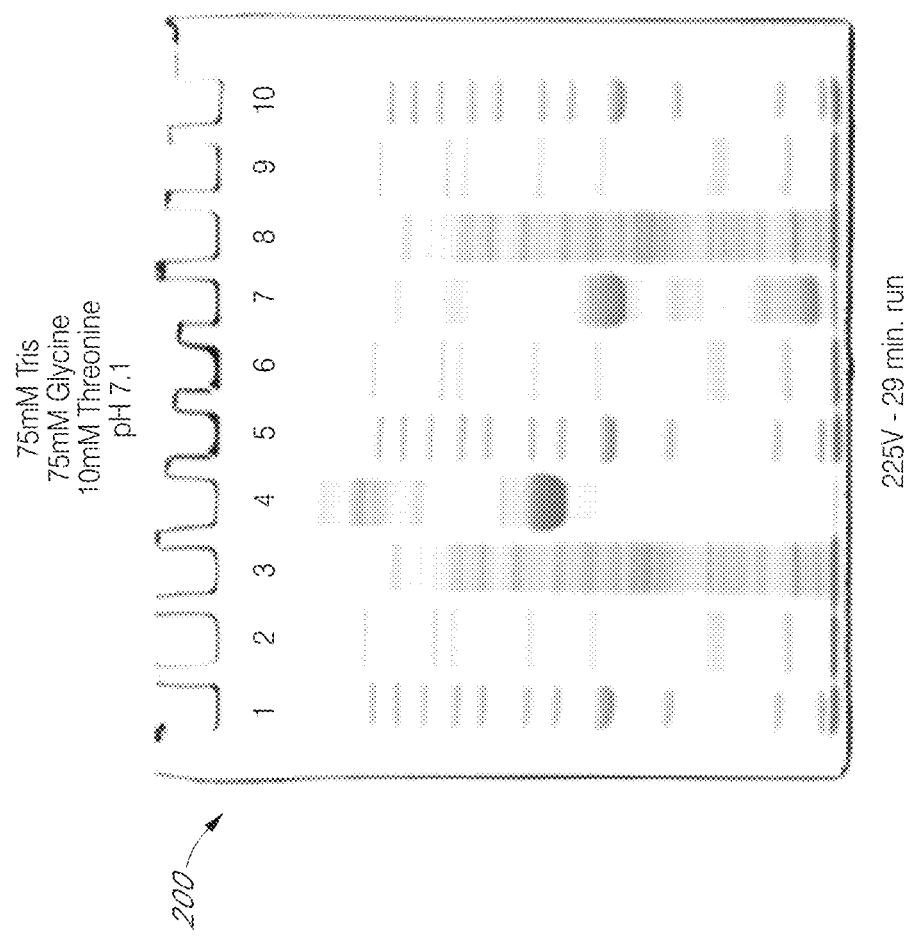
FIG. 2A shows an annotated grayscale photograph of an exemplary embodiment of a non-gradient polyacrylamide gel (T=10%), having a pH of 7.1 and having a polyacrylamide gel formulation including 75 mM Tris, 125 mM glycine, and 10 mM threonine, taken after the gel was used to perform an electrophoresis separation.
Figure 2B:
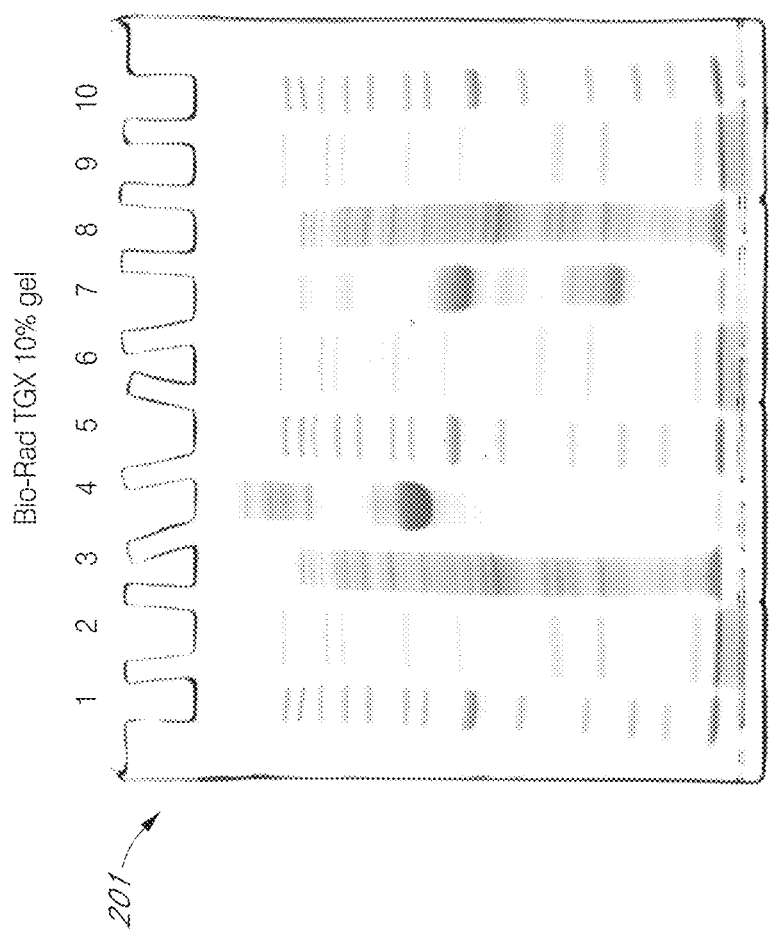
FIG. 2B shows an annotated grayscale photograph of a commercially available non-gradient polyacrylamide gel, namely Mini-PROTEAN® TGX™ gel (% T=10%) (of Bio-Rad Laboratories, Inc.), with a pH of about 6.5 and that is believed to include a polyacrylamide gel formulation of Tris, glycine, and taurine at unknown concentrations, taken after the gel was used to perform an electrophoresis separation.

Gel formulation 201, as shown in FIG. 2B, is a commercially available gel, namely Mini-PROTEAN® TGX™ (T=10%) gel (of Bio-Rad Laboratories, Inc.), that is believed to include a gel buffer of Tris, glycine, and taurine at unknown concentrations, that has a pH of 6.5. A sample buffer provided by the manufacturer of 65.8 mM Tris-HCl, 26.3% (w/v) glycerol, 2.1% SDS, and 0.01% bromophenol blue, having a at a pH of 6.8, was used with gel formulation 201. A running buffer provided by the manufacturer of 25 mM Tris, 192 mM glycine, and 0.1% SDS, having a pH of 8.3, was used with gel formulation 201.

Figure 2C:
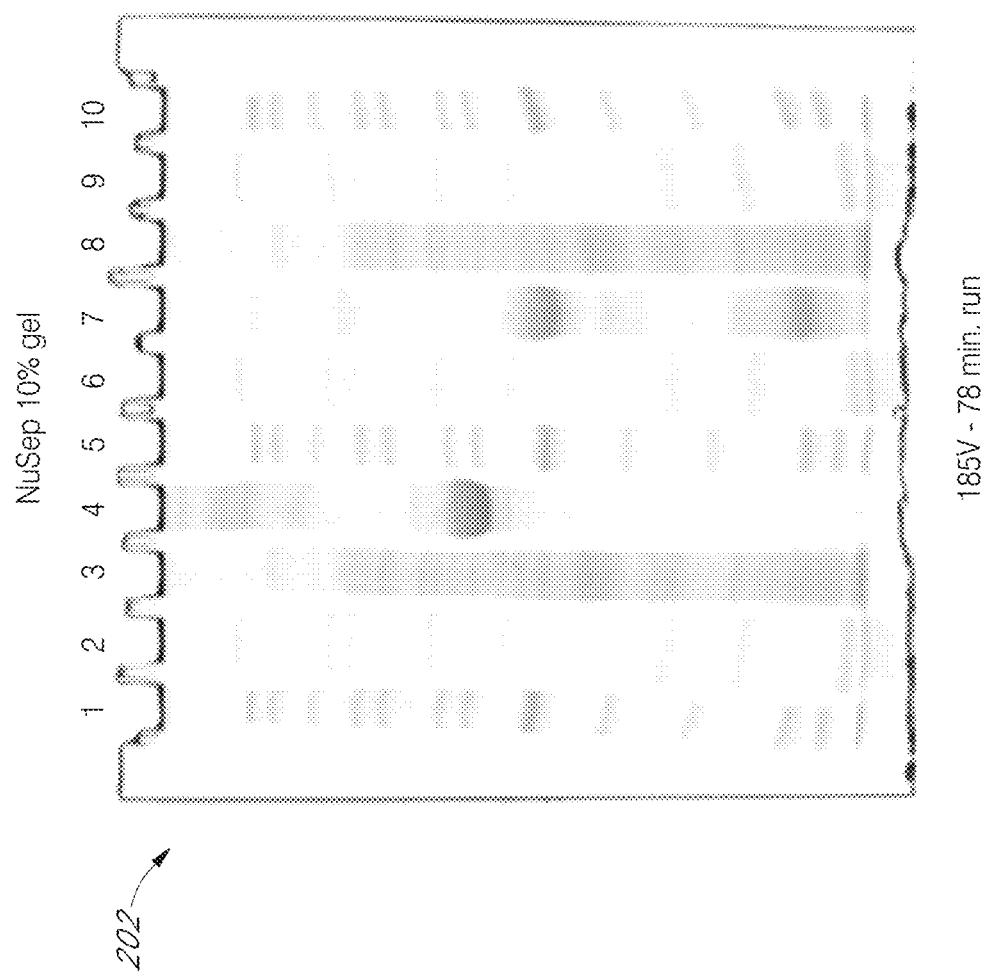
FIG. 2C shows an annotated grayscale photograph of a commercially available non-gradient polyacrylamide gel, namely Precise™ Tris-Glycine gel (% T=10%) (of Thermo Fisher Scientific, Inc.), with a pH of about 6.3 and that is believed to include a polyacrylamide gel formulation of Tris, glycine, and glycerol at unknown concentrations, taken after the gel was used to perform an electrophoresis separation.

Gel formulation 202, as shown in FIG. 2C, is another commercially available gel, namely Precise™ Tris-Glycine (T=10%) gel (of Thermo Fisher Scientific, Inc.), that is believed to include a buffer of Tris, glycine, and glycerol at unknown concentrations and a pH of about 6.3. A sample buffer provided by the manufacturer of 0.2 M triethanolamine-Cl, 1% LDS, 10% glycerol, 1% Ficoll™ 400, 0.006% phenol red, 0.006% Coomassie G250, and 0.5 mM EDTA disodium, having a pH of 7.6, was used with gel formulation 202. A running buffer provided by the manufacturer of 25 mM Tris, 192 mM glycine, and 0.1% SDS, having a pH of 8.5, was used with gel formulation 202.

Each gel cassette containing gel formulations 200-202 had ten parallel lanes 1-10. For each gel cassette, all ten lanes 1-10 were loaded with a sample protein mixture, each lane having the sample identified with it in Table 1 above. While the gels 200-202 had various gel buffer formulations, the gel buffer used within the resolving gel portion and the stacking gel portion of each individual gel was the same. Electrophoresis separations were performed at a constant voltage at either 185V or 225V, with run times ranging from 29 minutes to 78 minutes, as indicated in the FIGS. 2A-2C. The results were as follows:

Out of the three gel formulations 200-202, gel 200 provided the best observed protein separation and band sharpness. Comparably, the higher load bands of gel formulation 201 were more bowed-out, which is undesirable. For example, as shown in FIG. 2B, lane 3 of gels 201 are undesirably bent or curved towards the left edge of the gel. Similarly, lanes 7 and 8 of gel 202 are undesirably bent or curved toward the right edge of the gel. As shown in FIG. 2A, lanes 3, 7, and 8 of gel 200 are comparably straight and do not exhibit undesirable bending or curving. Regarding gel formulation 202, as shown in FIG. 2C, an undesirable "smiling effect" is exhibited in lanes 1, 2, 9, and 10, where low molecular weight protein bands near the left and right edges of gel 202 are curved or sloped upward. As shown in FIG. 2A, lanes 1, 2, 9, and 10 of gel 200 are comparably flat and do not exhibit undesirable curving or sloping. Additionally, as is particularly evident when comparing lanes 3, 4, 7, and 8 of gels 200-202, gel 200 produced sharper bands than gels 201 and 202.

Example 3

Figure 3A:
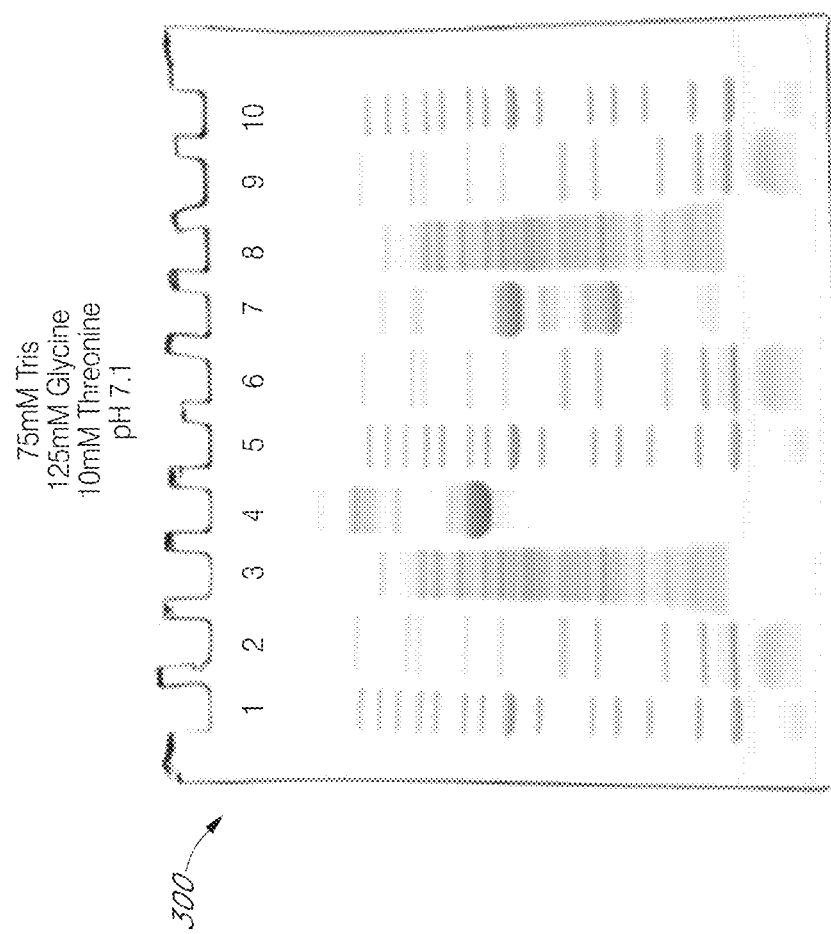
FIG. 3A shows an annotated grayscale photograph of an exemplary embodiment of a gradient polyacrylamide gel (% T=4-20%), having a pH of 7.1 and having a polyacrylamide gel formulation including 75 mM Tris, 125 mM glycine, and 10 mM threonine, taken after the gel was used to perform an electrophoresis separation.

This example illustrates a comparison of the performance a gradient polyacrylamide gel within the scope of the present disclosure with that of two commercially available gradient polyacrylamide gels. A polyacrylamide gel 300, shown individually in FIG. 3A, was cast in slab gel electrophoresis cassettes using 4-20% aqueous acrylamide/bisacrylamide solution (% T=4-20%) for the resolving gel portion, of which the bisacrylamide constituted 2.6% of the monomer mixture (C=2.6%). Prepared gel formulation 300 additionally had a 3% T, 2.6% C stacking gel portion. The gel 300 produced was 1 mm thick and about 8 cm long and about 8 cm wide. Gel 300 had a pH of 7.1 and included a gel buffer of 75 mM Tris as a gel amine buffer, 125 mM glycine as a primary ampholyte, and 10 mM threonine as a conjugate ampholyte. Note that in a gradient gel, the gel buffer concentration within the gel may vary with different concentrations of acrylamide, thus the gel buffer values provided here are average values. The gel buffer was adjusted to a pH of 7.1 with 6N HCl. A sample buffer of 63 mM Tris-HCl, 10% glycerol, 2% SDS, and 0.0025% bromophenol blue, having a at a pH of 6.8, was used with gel formulation 300. A running buffer of 25 mM Tris, 192 mM glycine, and 0.1% SDS, having a pH of 8.3, was used with gel formulation 300.

Figure 3B:
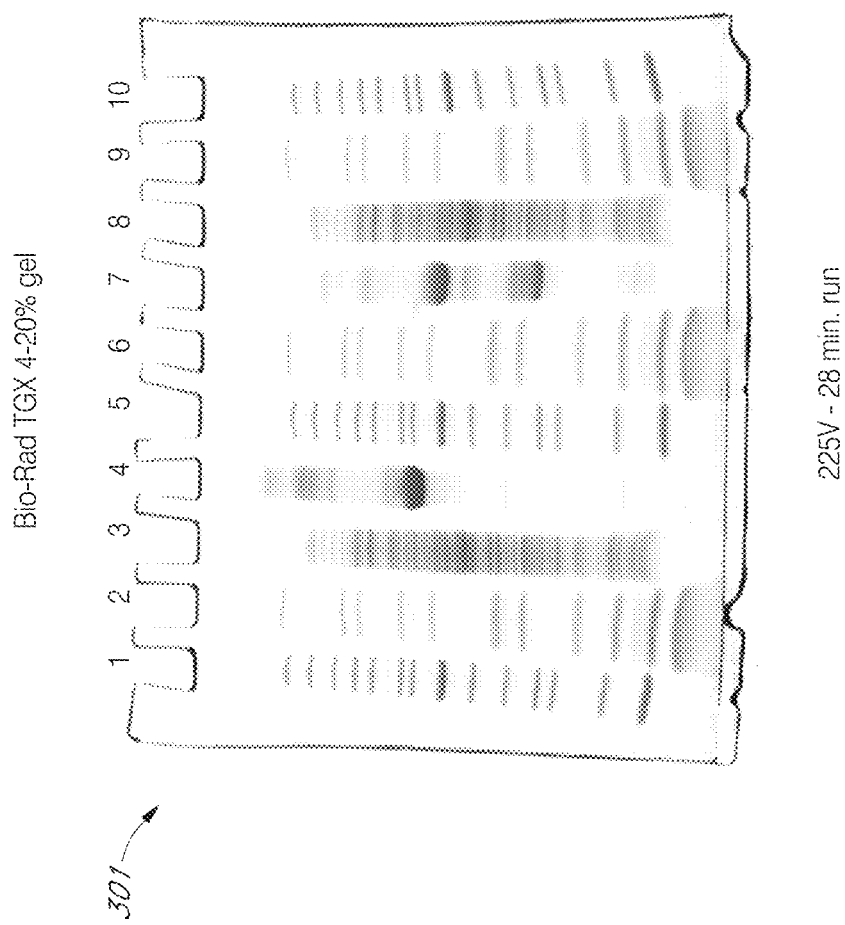
FIG. 3B shows an annotated grayscale photograph of a commercially available gradient polyacrylamide gel, namely Mini-PROTEAN® TGX™ gel (% T=4-20%) (of Bio-Rad Laboratories, Inc.), with a pH of 6.5 and that is believed to include a polyacrylamide gel formulation of Tris, glycine, and taurine at unknown concentrations, taken after the gel was used to perform an electrophoresis separation.

Gel 301, as shown in FIG. 3B, is a commercially available gradient polyacrylamide gel, namely Mini-PROTEAN® TGX™ (% T=4-20%) gel (of Bio-Rad Laboratories, Inc.), that is believed to include a gel buffer of Tris, glycine, and taurine at unknown concentrations, that has a pH of about 6.5. A sample buffer provided by the manufacturer of 65.8 mM Tris-HCl, 26.3% (w/v) glycerol, 2.1% SDS, and 0.01% bromophenol blue, having a at a pH of 6.8, was used with gel formulation 201. A running buffer provided by the manufacturer of 25 mM Tris, 192 mM glycine, and 0.1% SDS, having a pH of 8.3, was used with gel formulation 201.

Figure 3C:
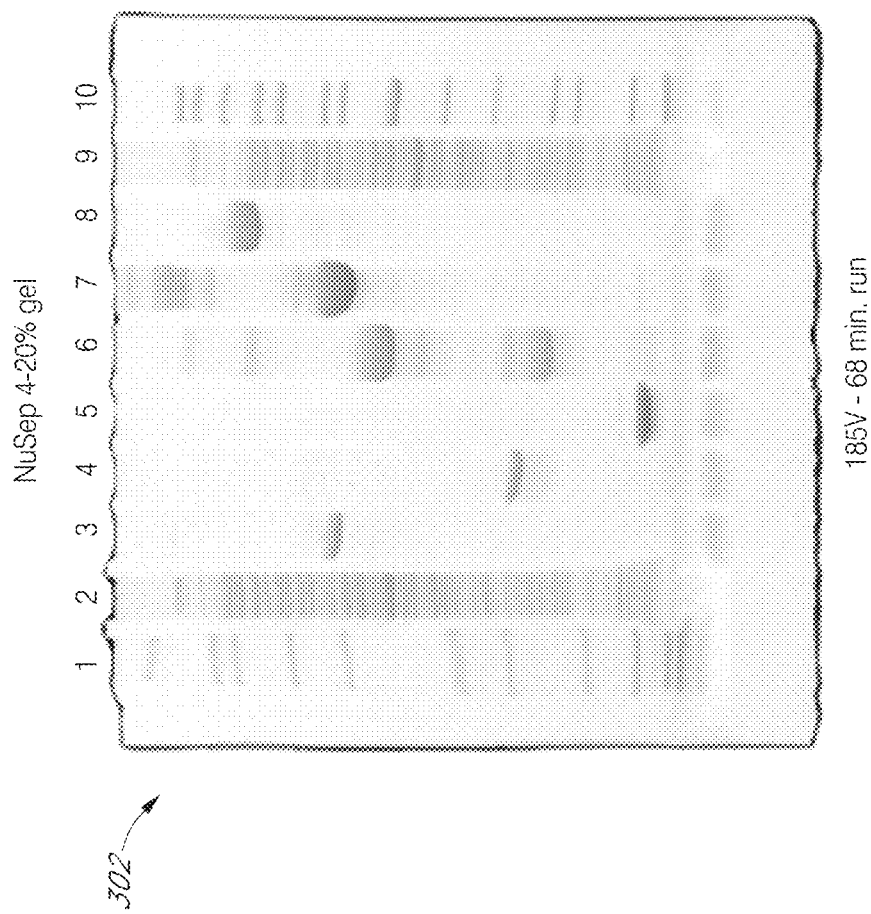
FIG. 3C shows an annotated grayscale photograph of a commercially available non-gradient polyacrylamide gel, namely Precise™ Tris-Glycine gel (% T=4-20%) (of Thermo Fisher Scientific, Inc.), with a pH of about 6.3 and that is believed to include a polyacrylamide gel formulation of Tris, glycine, and glycerol at unknown concentrations, taken after the gel was used to perform an electrophoresis separation.

Gel 302, as shown in FIG. 3C, is another commercially available gradient polyacrylamide gel, namely Precise Tris-Glycine (% T=10%) gel (of NuSep Holdings Ltd.), that is believed to include a buffer of Tris, glycine, and glycerol at unknown concentrations and a pH of about 6.3. A sample buffer provided by the manufacturer of 0.2 M triethanolamine-Cl, 1% LDS, 10% glycerol, 1% Ficoll™ 400, 0.006% phenol red, 0.006% Coomassie G250, and 0.5 mM EDTA disodium, having a pH of 7.6, was used with gel formulation 302. A running buffer provided by the manufacturer of 25 mM Tris, 192 mM glycine, and 0.1% SDS, having a pH of 8.5, was used with gel formulation 302. (confirmed for gel labeled 302)

Each gel cassette containing the different gel formulations 300-302 had ten parallel lanes 1-10. For each gel, all ten lanes 1-10 were loaded with a sample protein mixture, each lane having the sample identified with it in Table 1 above.

While the gels 300-302 had various gel buffer formulations, the gel buffer used within the resolving gel portion and the stacking gel portion of each individual gel was the same. Electrophoresis separations were performed at a constant voltage of either 185 or 225V with run times ranging from 28 minutes to 68 minutes, as reflected in FIGS. 3A-3C. The results were as follows:

Out of the three gels 300-302, gel 300 provided the best observed protein separation and band sharpness. As is particularly evident when comparing lanes 3, 4, 7, and 8 of gels 300-302, gel 300 produced sharper bands than gels 301 and 302. Additionally, as is particularly shown in lanes 1 and 10 of gel 301 and lanes 3 and 4 of gel 302, both gels 301 and 302 had lanes which exhibited an undesirable smiling effect, whereas all lanes 1-10 of gel 300 were comparatively flat.

Example 4

This example illustrates a comparison of the performance a gradient polyacrylamide gel within the scope of the present disclosure with that of one commercially available gradient polyacrylamide gel. A polyacrylamide gel 400, shown individually in FIG. 4A, was cast in slab gel electrophoresis cassettes using 8-16% aqueous acrylamide/bisacrylamide solution (% T=8-16%) for the resolving gel portion, of which the bisacrylamide constituted 2.6% of the monomer mixture (C=2.6%). Prepared gel formulation 400 additionally had a 3.5% T, 2.6% C stacking gel portion. Gel 400 had a pH of 7.1 and included a gel buffer of 117 mM Tris, 195 mM glycine, and 15.6 mM threonine. Note that in a gradient gel, the gel buffer concentration within the gel varies similarly with the concentration of acrylamide, thus the gel buffer values provided are average values. The gel buffer was adjusted to a pH of 7.1 with 6N HCl. A sample buffer of 63 mM Tris-HCl, 10% glycerol, 2% SDS, and 0.0025% bromophenol blue, having a at a pH of 6.8, was used with gel formulation 400. A running buffer of 25 mM Tris, 192 mM glycine, and 0.1% SDS, having a pH of 8.3, was used with gel formulation 400.

Figure 4B:
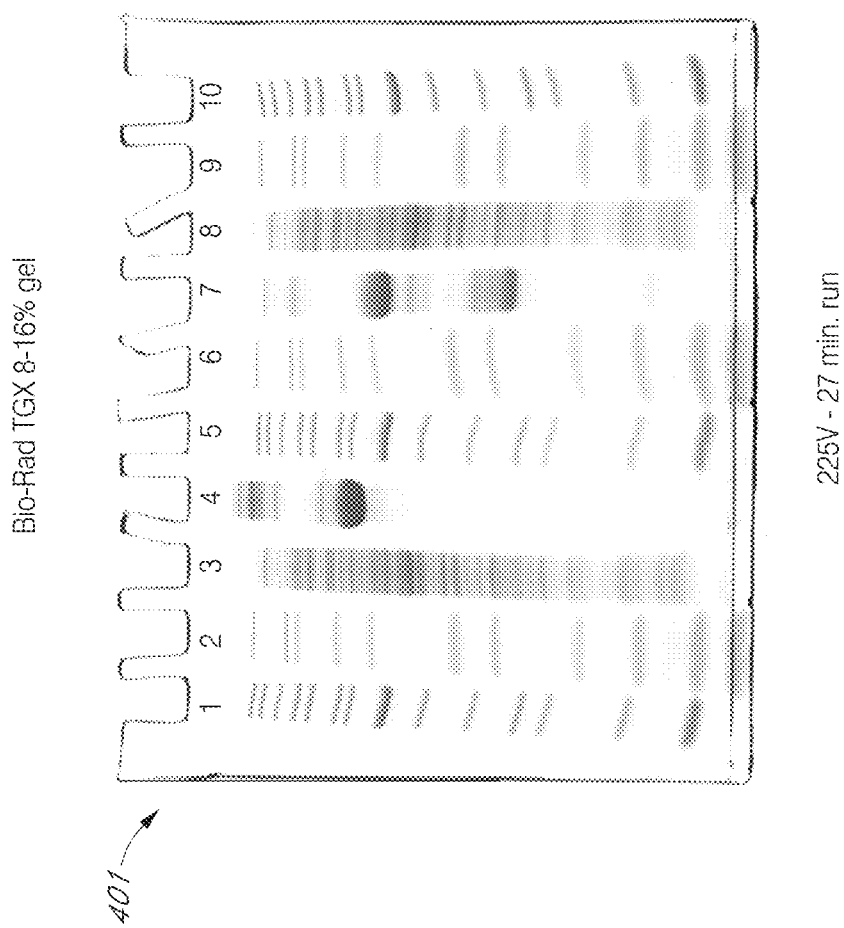
FIG. 4B shows an annotated grayscale photograph of a commercially available gradient polyacrylamide gel, namely Mini-PROTEAN® TGX™ gel (T=8-16%) (of Bio-Rad Laboratories, Inc.), with a pH of about 6.5 and that is believed to include a polyacrylamide gel formulation of Tris, glycine, and taurine at unknown concentrations, taken after the gel was used to perform an electrophoresis separation.

Gel 401, as shown in FIG. 4B, is a commercially available gradient polyacrylamide gel, namely Mini-PROTEAN® TGX™ (T=8-16%) gel (of Bio-Rad Laboratories, Inc.), that is believed to include a gel buffer of Tris, glycine, and taurine at unknown concentrations, that has a pH of about 6.5. A sample buffer provided by the manufacturer of 65.8 mM Tris-HCl, 26.3% (w/v) glycerol, 2.1% SDS, and 0.01% bromophenol blue, having a at a pH of 6.8, was used with gel formulation 201. A running buffer provided by the manufacturer of 25 mM Tris, 192 mM glycine, and 0.1% SDS, having a pH of 8.3, was used with gel formulation 201.

Each gel cassette loaded with the gel formulations 400-401 had ten parallel lanes 1-10. For each gel, all ten lanes 1-10 were loaded with a sample protein mixture, each lane having the sample identified with it in Table 1 above, except that lane 8 in gel 400 was loaded with a 20 µg sample of E. coli (rather than 10 µg). While the gels 400-401 had various gel buffer formulations, the gel buffer used within the resolving gel portion and the stacking gel portion of each individual gel was the same. Electrophoresis separations were performed at a constant voltage of 225V with run times ranging from 27 minutes to 45 minutes, as reflected in FIGS. 4A and 4B. The results were as follows:

Gel 400 exhibited better protein separation and band sharpness than gel 401. As is particularly evident when comparing lanes 2, 3, 4, and 7 of gels 400-401, gel 400 produced sharper bands than gel 401. Additionally, as is particularly shown in lanes 1 and 10 of gel 401, gel 401 had lanes which exhibited an undesirable smiling effect, whereas all lanes 1-10 of gel 400 were comparatively flat.

Example 5

Figure 5:
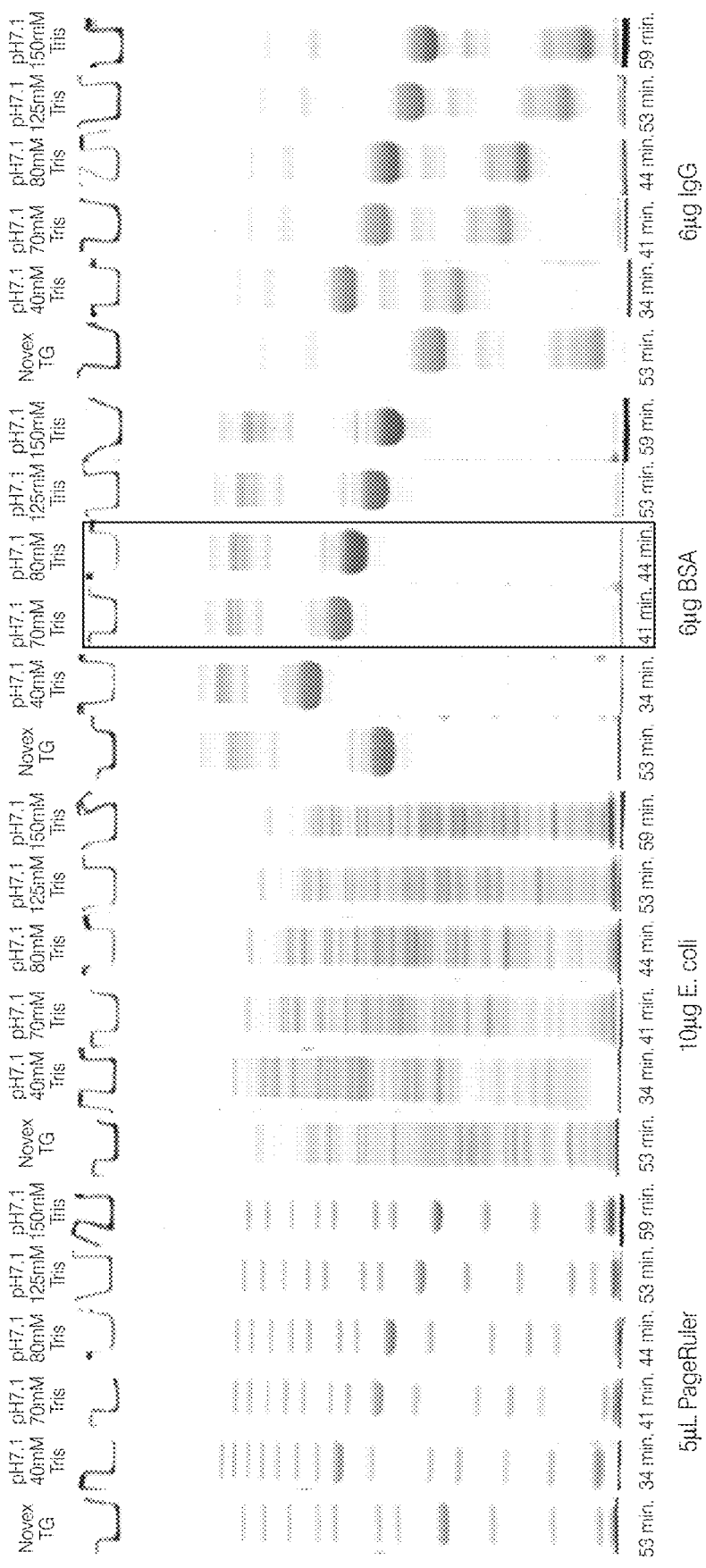
FIG. 5 shows side-by-side annotated grayscale photographs of PageRuler™ Plus Pre-Stained Protein Ladder loaded, E. Coli loaded, BSA loaded, and IgG loaded lanes of six non-gradient polyacrylamide gels taken after the gels were used to perform electrophoresis separation, where one gel is a commercially available non-gradient polyacrylamide gel, namely Novex™ Tris-Glycine polyacrylamide gel (T=10%) (of Thermo Fisher Scientific, Inc.), having a control polyacrylamide gel formulation with a pH of 8.7 and including 400 mM Tris and 0 mM glycine, and five of the gels are an exemplary embodiment of a non-gradient polyacrylamide gel (T=10%) having a pH of 7.1 and varied concentrations of threonine.

This example, as shown in FIG. 5, illustrates the performance of five polyacrylamide gels within the scope of this disclosure, in which gel buffers having various concentrations of Tris were included to identify a desired Tris concentration range for gel buffers of the present disclosure. The performance of each gel was also compared to a control gel, namely a commercially available Novex™ Tris-Glycine polyacrylamide gel (% T=10%) (by Thermo Fisher Scientific, Inc.), that includes a gel buffer formulation of 400 mM and 0 mM glycine, and has a pH of 8.7.

The five prepared polyacrylamide gels were cast in slab gel electrophoresis cassettes using 10% aqueous acrylamide/bisacrylamide solution (% T=10%) for the resolving gel portion, of which the bisacrylamide constituted 2.6% of the monomer mixture (% C=2.6%). The five prepared gel were 1 mm thick and about 8 cm long and about 8 cm wide. The prepared gels additionally had a 3.3% T, 2.6% C stacking gel portion. The five prepared gels each had a gel buffer formulation with a 7.1 pH that included 125 mM glycine as a primary ampholyte and 75 mM threonine as a conjugate ampholyte. Also, each of the five prepared gels had a gel buffer with a different Tris concentration, ranging from 40 mM to 150 mM, as a gel amine buffer. The gel buffers were adjusted to a pH of 7.1 with 6N HCl.

Each gel cassette was formed to have a plurality of parallel lanes, which were individually loaded with a sample protein mixture. While each of the control gel and prepared gels had various gel buffer formulations, the gel buffer used within the resolving gel portion and the stacking gel portion of each individual gel was the same. Four of the lanes of each of the prepared gels and the control gel were loaded with a 5 µL PageRuler™ Plus Pre-Stained Protein Ladder, 10 µg E. Coli, 6 µg BSA, and 6 µg Human Immunoglobulin G (IgG), respectively.

A sample buffer of 63 mM Tris-HCl, 10% glycerol, 2% SDS, and 0.0025% bromophenol blue, having a at a pH of 6.8, was used with each gel formulation in FIG. 5. A running buffer of 25 mM Tris, 192 mM glycine, and 0.1% SDS, having a pH of 8.3, was used with each gel formulation in FIG. 5. Electrophoresis separations were performed at a constant voltage of 225V with run times ranging from 34 minutes to 59 minutes, with the specific run time being reflected in FIG. 5. The results, shown in FIG. 5 and Table 2, were as follows:

TABLE 2

Gel run time, current, and temperature data for Example 5.

| Gel Type | Run Time (min) | Starting Current (mA/gel) | Ending Current (mA/gel) | Cathode Buffer Temperature at End of Run (° C.) |
|---|---|---|---|---|
| Novex 10% TG | 53 | 46 | 29 | 39 |
| TGT (40 mM Tris) | 34 | 33 | 16 | 29 |
| TGT (70 mM Tris) | 41 | 40 | 21 | 32.5 |
| TGT (80 mM Tris) | 44 | 41 | 22 | 33 |
| TGT (125 mM Tris) | 53 | 48 | 29 | 39 |
| TGT (150 mM Tris) | 59 | 48 | 32 | 41 |

For ease of comparison, FIG. 5 shows images of the PageRuler™ Plus Pre-Stained Protein Ladder loaded, E. Coli loaded, BSA loaded, and IgG loaded lanes of each of the six gels side-by-side. As can be seen with all four samples, the protein bands shift upwards in the Tris-glycine-threonine (TGT) gel and become flatter and wider as the concentration of Tris in the gel buffer decreased. A lower Tris concentration also provided a shorter run time, lower electric current, and lower temperature during electrophoresis. As can be seen most clearly in the comparison of lanes loaded with BSA, prepared gels having a buffer with a Tris concentration ranging from 70 mM to 80 mM produced sharp protein bands at a lower run time, current, and temperature than the control gel. Additionally, prepared gels having a buffer with 70 mM to 80 mM Tris produced protein bands that were not shifted as far up the gel as those of the 40 mM Tris buffer gel. Moreover, prepared gels having a buffer with 70 mM to 80 mM Tris produced protein bands that were much sharper than those of the 125 mM Tris and 150 mM Tris buffer gels.

Therefore, these results indicate that a Tris concentration ranging from about 70 mM to about 80 mM produces desirable separation characteristics for a gel buffer in a non-gradient polyacrylamide gel, wherein the gel buffer also includes glycine as a primary ampholyte and threonine as a conjugate ampholyte Example 6

Figure 6A:
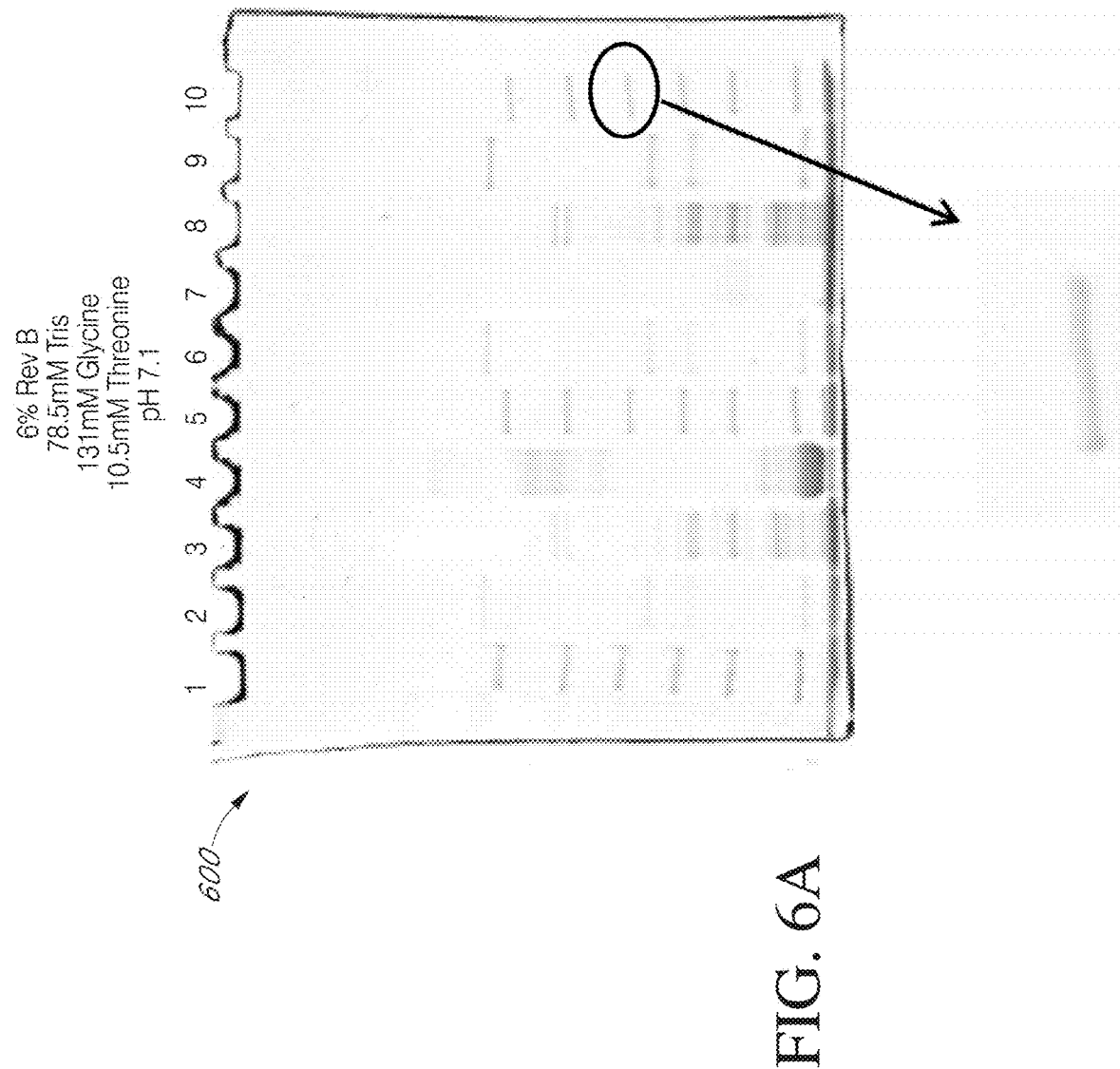
FIG. 6A shows an annotated grayscale photograph of an exemplary embodiment of a non-gradient polyacrylamide gel (% T=6%), having a pH of 7.1 and having a polyacrylamide gel formulation including 78.5 mM Tris, 131 mM glycine, and 10.5 mM threonine, taken after the gel was used to perform an electrophoresis separation.
Figure 6B:
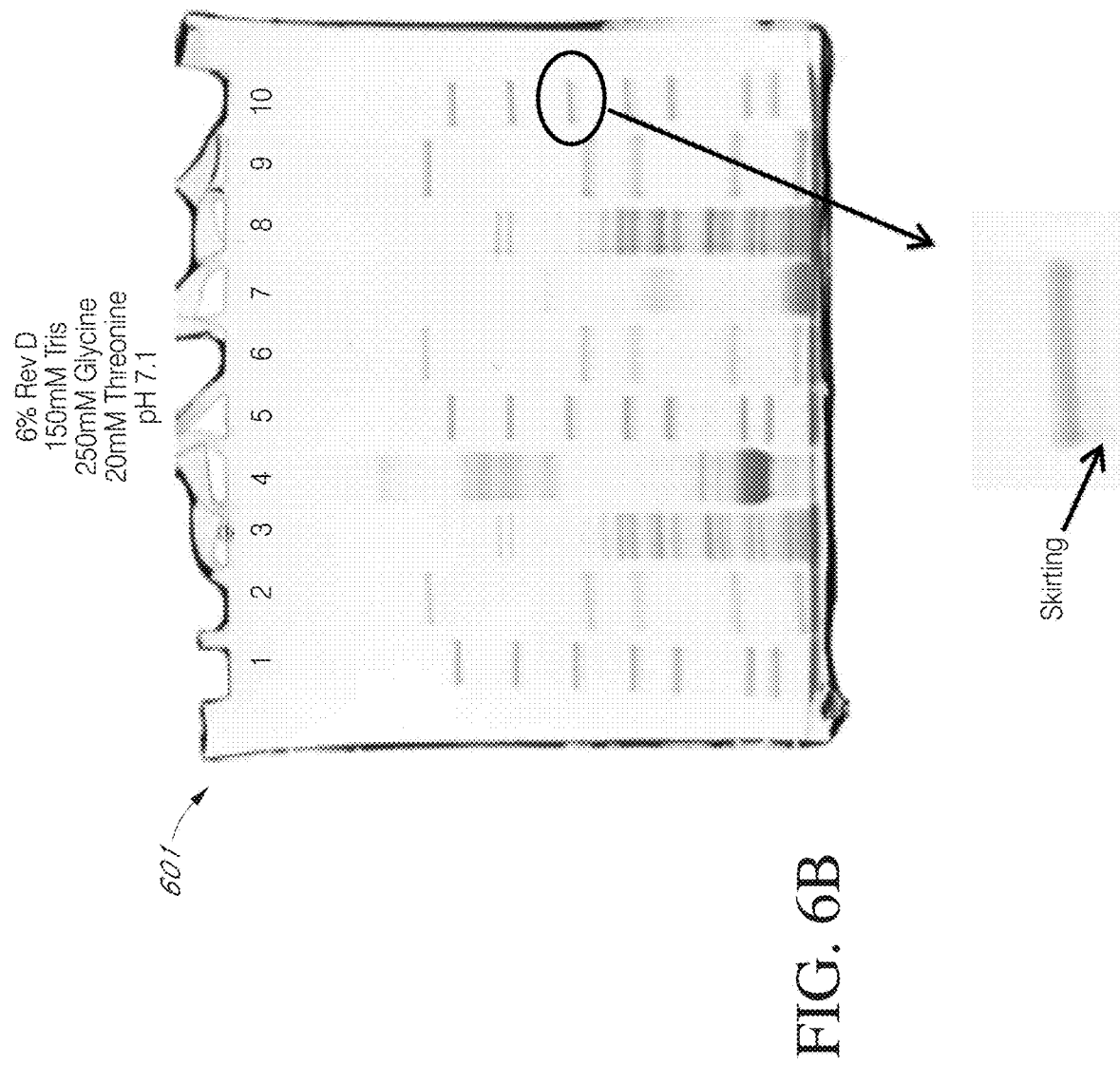
FIG. 6B shows an annotated grayscale photograph of an exemplary embodiment of a non-gradient polyacrylamide gel (% T=6%), having a pH of 7.1 and having a polyacrylamide gel formulation including 150 mM Tris, 250 mM glycine, and 20 mM threonine, taken after the gel was used to perform an electrophoresis separation.
Figure 6C:
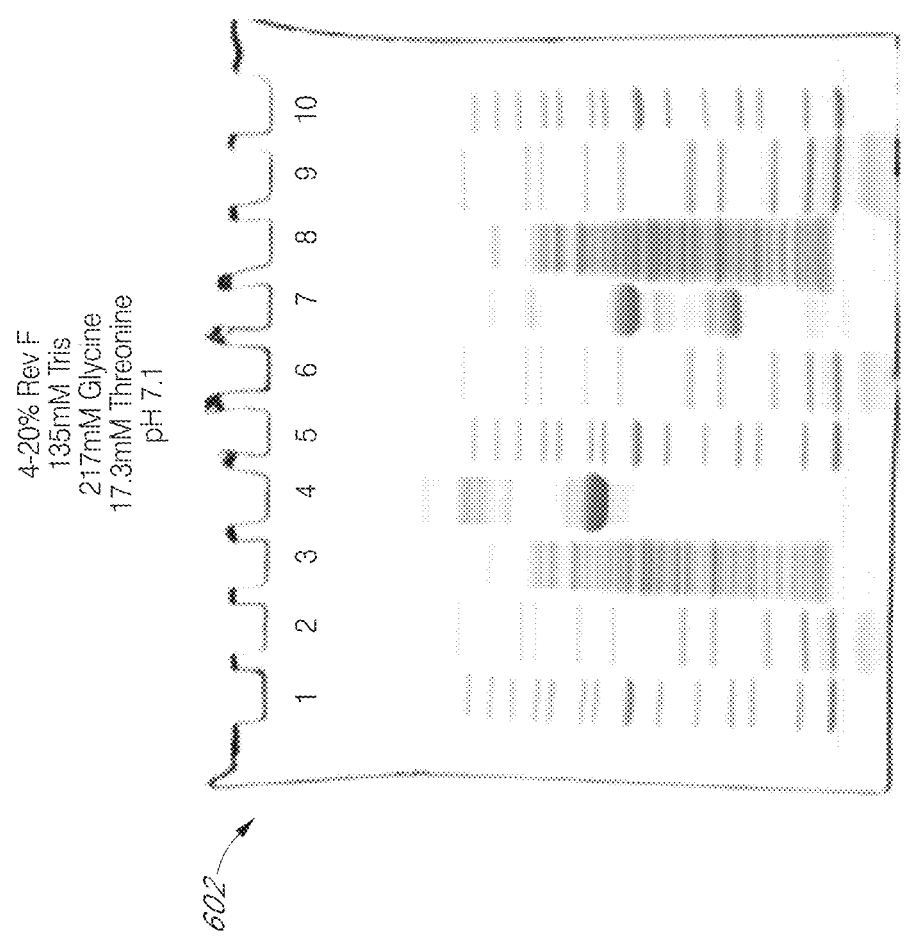
FIG. 6C shows an annotated grayscale photograph of an exemplary embodiment of a gradient polyacrylamide gel (T=4-20%), having a pH of 7.1 and having a polyacrylamide gel formulation including 135 mM Tris, 217 mM glycine, and 17.3 mM threonine, taken after the gel was used to perform an electrophoresis separation.

This example, as shown in FIGS. 6A-6C, illustrates the performance of three polyacrylamide gels within the scope of this disclosure. Non-gradient polyacrylamide gel formulations 600-601, shown individually in FIGS. 6A and 6B, respectively, were cast in slab gel electrophoresis cassettes using 6% aqueous acrylamide/bisacrylamide solution (% T=10%) for the resolving gel portion, of which the bisacrylamide constituted 2.6% of the monomer mixture (% C=2.6%). Prepared gel formulations 600 and 601 additionally had a 4% T, 2.6% C stacking gel portion. Gradient polyacrylamide gel 602, shown individually in FIG. 6C, was cast in slab gel electrophoresis cassettes using 4-20% aqueous acrylamide/bisacrylamide solution (% T=4-20%) for the resolving gel portion, of which the bisacrylamide constituted 2.6% of the monomer mixture (% C=2.6%). Prepared gel formulation 602 additionally had a 3% T, 2.6% C stacking gel portion. The gels produced were 1 mm thick and about 8 cm long and about 8 cm wide. Each gel cassette containing the gel formulations 600-602 was formed to have ten parallel lanes 1-10.

The gel buffers were adjusted to a pH of 7.1 with 6N HCl. A sample buffer of 63 mM Tris-HCl, 10% glycerol, 2% SDS, and 0.0025% bromophenol blue, having a at a pH of 6.8, was used with gel formulation 600-602. A running buffer of 25 mM Tris, 192 mM glycine, and 0.1% SDS, having a pH of 8.3, was used with gel formulation 600-602. While each of the gels 600-602 had various gel buffer formulations, the gel buffer used within the resolving gel portion and the stacking gel portion of each individual gel was the same. For each gel 600-602, all ten lanes 1-10 were loaded with a sample protein mixture, each lane having the sample identified with it in Table 1 above.

Gel 600, as shown in FIG. 6A, had a pH of 7.1 and included a gel buffer of 78.5 mM Tris, 131 mM glycine, and 10.5 mM threonine. Gel 601, as shown in FIG. 6B, had a pH of 7.1 and included a gel buffer of 150 mM Tris, 250 mM glycine, and 20 mM threonine. A comparison of the blown-up portions of lane 10 of each gel 600 and 601 shows that at least one protein band of gel 601 had skirting while the same band in gel 600 did not have skirting. Skirting is the observed phenomenon of the leading edge of a band running in the interface area between the gel and cassette, producing a low density portion of protein that runs slightly ahead of the major band. Skirting is effectively a spreading of the protein over a wider area, reducing its density in the band and the band sharpness, and potentially reducing protein detectability. Therefore, a comparison of gels 600 and 601 shows that a Tris concentration ranging from about 70 mM to about 80 mM produced desirable electrophoresis separation characteristics for a non-gradient polyacrylamide gel within the scope of the present disclosure, wherein % T=6% and the gel buffer also included glycine as a primary ampholyte and threonine as a conjugate ampholyte.

Gel 602, as shown in FIG. 6C, had a pH of 7.1 and included a gel buffer of 135 mM Tris, 217 mM glycine, and 17.3 mM threonine. FIG. 6C shows that gradient gel 602 provided acceptable protein band sharpness and resolution. Therefore, gel 602 shows that a higher Tris concentration from about 125 mM to about 150 mM is acceptable for gradient polyacrylamide gels within the scope of this disclosure, wherein the gel buffer also included glycine as an ampholyte/trailing ion and threonine as a secondary ampholyte/trailing ion.

Example 7

Figure 7:
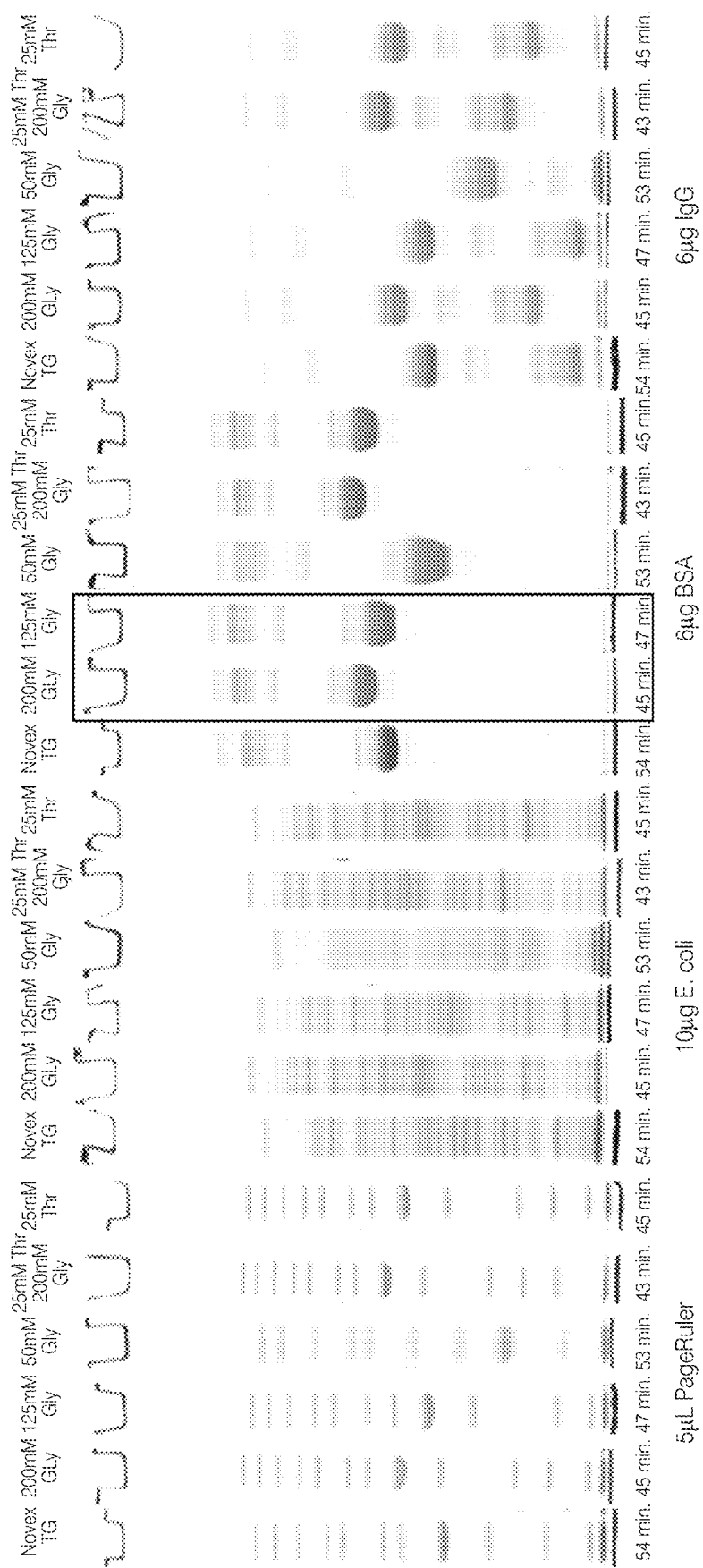
FIG. 7 shows side-by-side annotated grayscale photographs of PageRuler™ Plus Pre-Stained Protein Ladder loaded, E. Coli loaded, BSA loaded, and IgG loaded lanes of six non-gradient polyacrylamide gels taken after the gels were used to perform electrophoresis separation, where one gel is a commercially available non-gradient polyacrylamide gel, namely Novex™ Tris-Glycine polyacrylamide gel (T=10%) (of Thermo Fisher Scientific, Inc.), having a control polyacrylamide gel formulation with a pH of 8.7 and including 400 mM Tris and 0 mM glycine, and five of the gels are an exemplary embodiment of a non-gradient polyacrylamide gel (T=10%) having a pH of 7.1 and varied concentrations of glycine.

This example, as shown in FIG. 7, illustrates the performance of five polyacrylamide gels within the scope of this disclosure, in which gel buffers various concentrations of glycine were included to identify an optimal glycine concentration range for gel buffers of the present disclosure. The performance of each gel was also compared to a control gel, namely a commercially available Novex™ Tris-Glycine polyacrylamide gel (% T=10%) (by Thermo Fisher Scientific, Inc.), that includes a gel buffer formulation of 400 mM and 0 mM glycine, and has a pH of 8.7.

The five prepared polyacrylamide gels were cast in slab gel electrophoresis cassettes using 10% aqueous acrylamide/bisacrylamide solution (% T=10%) for the resolving gel portion, of which the bisacrylamide constituted 2.6% of the monomer mixture (C=2.6%). The five prepared gels each had a gel buffer formulation with a 7.1 pH. The five prepared gel were 1 mm thick and about 8 cm long and about 8 cm wide. The first prepared gel had a gel buffer formulation of 75 mM Tris and 200 mM glycine. The second prepared gel had a gel buffer formulation of 75 mM Tris and 125 mM glycine. The third prepared gel had a gel buffer formulation of 75 mM Tris and 50 mM glycine. The fourth prepared gel had a gel buffer formulation of 75 mM Tris, 25 mM threonine, and 200 mM glycine. The fifth prepared gel had a gel buffer formulation of 75 mM Tris, 25 mM threonine, and 125 mM glycine. Thus, each of the five prepared gels had a gel buffer with a varied glycine concentration, ranging from 50 mM to 200 mM. While each of the control gel and prepared gels had various gel buffer formulations, the gel buffer used within the resolving gel portion and the stacking gel portion of each individual gel was the same.

Each gel was formed to have a plurality of parallel lanes, which were individually loaded with a sample protein mixture. Four of the lanes of each of the prepared gels and the control gel were loaded with a 5 μL PageRuler™ Plus Pre-Stained Protein Ladder, 10 μg E. Coli, 6 μg BSA, and 6 μg IgG, respectively. A sample buffer of 63 mM Tris-HCl, 10% glycerol, 2% SDS, and 0.0025% bromophenol blue, having a at a pH of 6.8, was used with each gel formulation in FIG. 7. A running buffer of 25 mM Tris, 192 mM glycine, and 0.1% SDS, having a pH of 8.3, was used with each gel formulation in FIG. 7. Electrophoresis separations were performed at a constant voltage of 225V with run times ranging from 34 minutes to 59 minutes, with the specific run time being reflected in FIG. 7. The results, shown in FIG. 7 and Table 3, were as follows:

TABLE 3

Gel run time, current, and temperature data for Example 7.

| Gel Type | Run Time (min) | Starting Current (mA/gel) | Ending Current (mA/gel) | Cathode Buffer Temperature at End of Run (° C.) |
|---|---|---|---|---|
| Novex 10% TG | 54 | 46 | 29 | 39 |
| TGT (200 mM glycine) | 45 | 40 | 21 | 33 |
| TGT (125 mM glycine) | 47 | 41 | 19 | 33 |
| TGT (50 mM glycine) | 53 | 41 | 16 | 33 |
| TGT (200 mM glycine/25 mM threonine) | 43 | 41 | 21 | 33 |
| TGT (125 mM glycine/25 mM threonine) | 45 | 41 | 21 | 33 |

For ease of comparison, FIG. 7 show images of the PageRuler™ Plus Pre-Stained Protein Ladder loaded, E. Coli loaded, BSA loaded, and IgG loaded lanes of each of the six gels side-by-side. As can be seen with all four samples, the protein bands shift upwards in the Tris-glycine-threonine (TGT) gel and become flatter and wider as the concentration of glycine in the gel buffer increases. A higher glycine concentration also provided a shorter run time. As can be seen most clearly in the comparison of lanes loaded with BSA, prepared gels having a buffer with higher glycine concentration produced sharp protein bands at a lower run time, current, and temperature than the control gel. Therefore, these results indicate that a glycine concentration ranging from about 100 mM to about 250 mM produces desirable separation characteristics for a gel buffer for a gel buffer in a polyacrylamide gel, wherein the gel buffer also includes Tris as a gel amine buffer and threonine as a conjugate ampholyte.

Example 8

Figure 8:
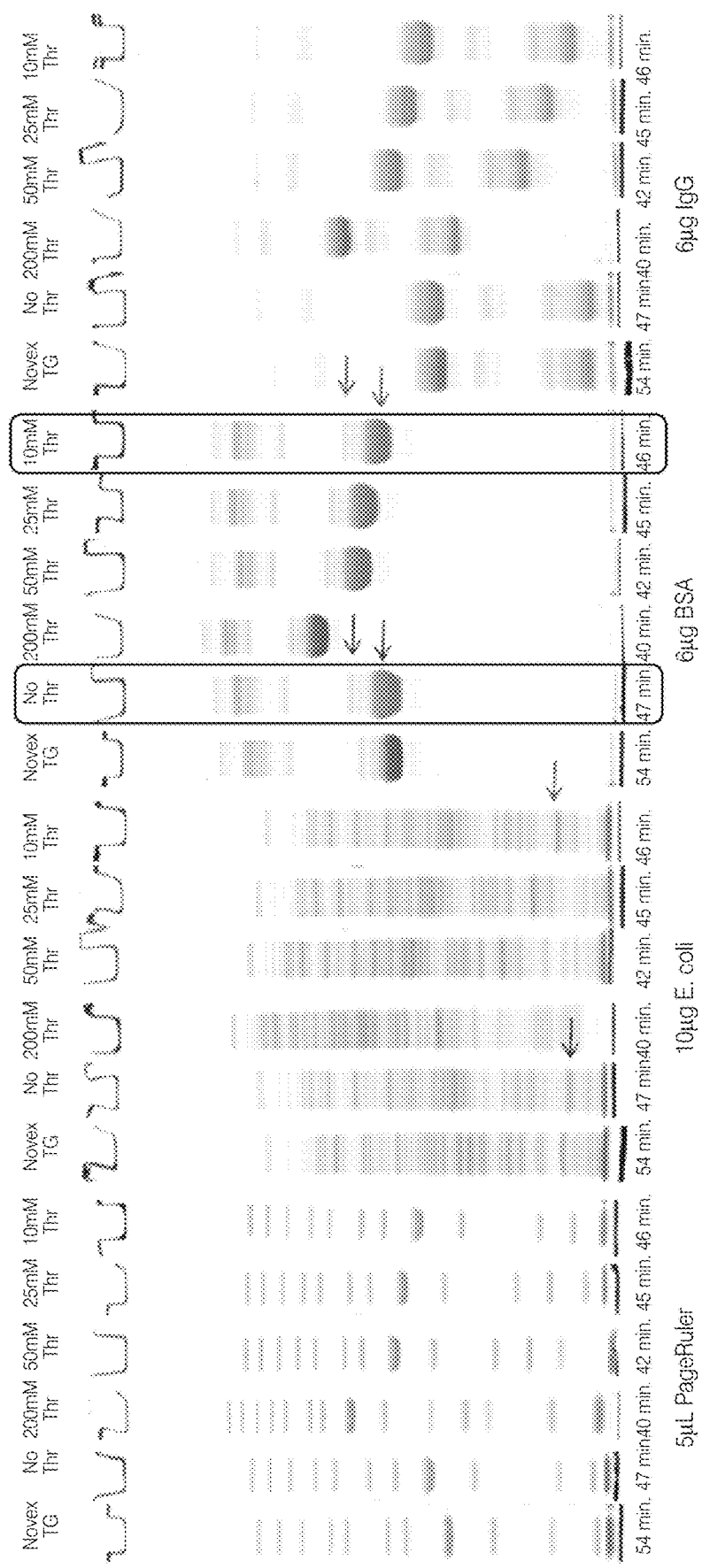
FIG. 8 shows side-by-side annotated grayscale photographs of PageRuler™ Plus Pre-Stained Protein Ladder loaded, E. Coli loaded, BSA loaded, and IgG loaded lanes of six non-gradient polyacrylamide gels taken after the gels were used to perform an electrophoresis separation, where one gel is a commercially available non-gradient polyacrylamide gel, namely Novex™ Tris-Glycine polyacrylamide gel (T=10%), having a control polyacrylamide gel formulation with a pH of 8.7 and including 400 mM Tris and 0 mM glycine, and five of the gels are an exemplary embodiment of a non-gradient polyacrylamide gel (T=10%) having a pH of 7.1 and varied concentrations of threonine.

This example, as shown in FIG. 8, illustrates the performance of five polyacrylamide gels within the scope of this disclosure, in which gel buffers various concentrations of threonine were included to identify an optimal threonine concentration range for gel buffers of the present disclosure. The performance of each gel was also compared to a control gel, namely a commercially available Novex™ Tris-Glycine polyacrylamide gel (T=10%) (by Thermo Fisher Scientific, Inc.), that includes a gel buffer formulation of 400 mM and 0 mM glycine, and has a pH of 8.7. The five prepared polyacrylamide gels were cast in slab gel electrophoresis cassettes using 10% aqueous acrylamide/bisacrylamide solution (% T=10%) for the resolving gel portion, of which the bisacrylamide constituted 2.6% of the monomer mixture (% C=2.6%). The five prepared gel were 1 mm thick and about 8 cm long and about 8 cm wide. The five prepared gels each had a gel buffer formulation with a 7.1 pH that included 75 mM Tris and 125 mM glycine. Also, each of the five prepared gels had a gel buffer with a different threonine concentration, ranging from 0 mM to 200 mM. While each of the control gel and prepared gels had various gel buffer formulations, the gel buffer used within the resolving gel portion and the stacking gel portion of each individual gel was the same.

Each gel was formed to have a plurality of parallel lanes, which were individually loaded with a sample protein mixture. Four of the lanes of each of the prepared gels and the control gel were loaded with a 5 µL PageRuler™ Plus Pre-Stained Protein Ladder, 10 µg E. Coli, 6 µg BSA, and 6 µg IgG, respectively. A sample buffer of 63 mM Tris-HCl, 10% glycerol, 2% SDS, and 0.0025% bromophenol blue, having a at a pH of 6.8, was used with each gel formulation in FIG. 8. A running buffer of 25 mM Tris, 192 mM glycine, and 0.1% SDS, having a pH of 8.3, was used with each gel formulation in FIG. 8. Electrophoresis separations were performed at a constant voltage of 225V with run times ranging from 40 minutes to 54 minutes, with the specific run time being reflected in FIG. 7. The results, shown in FIG. 8 and Table 4, were as follows:

TABLE 4

Gel run time, current, and temperature data for Example 8.

| Gel Type | Run Time (min) | Starting Current (mA/gel) | Ending Current (mA/gel) | Cathode Buffer Temperature at End of Run (° C.) |
|---|---|---|---|---|
| Novex 10% TG | 54 | 46 | 29 | 39 |
| TGT (40 mM Tris) | 47 | 41 | 19 | 33 |
| TGT (70 mM Tris) | 40 | 41 | 25 | 34 |
| TGT (80 mM Tris) | 42 | 41 | 21 | 34 |
| TGT (125 mM Tris) | 45 | 41 | 21 | 33 |
| TGT (150 mM Tris) | 46 | 41 | 19 | 33 |

For ease of comparison, FIG. 8 show images of the PageRuler™ Plus Pre-Stained Protein Ladder loaded, E. Coli loaded, BSA loaded, and IgG loaded lanes of each of the six gels side-by-side. As can be seen with all four samples, the protein bands shift upwards in the Tris-glycine-threonine (TGT) gels as the concentration of threonine in the gel buffer increases. Increased threonine concentration also provided a shorter run time and lower electric current. Additionally, increased threonine correlated with increased sharpness of some, but not all protein bands. As can be seen most clearly in the comparison of lanes loaded with BSA and E. Coli, prepared gels having a buffer with a threonine concentration of 10 mM produced sharp protein bands at a lower run time, current, and temperature than the control gel and the prepared gel with no threonine in the buffer. Additionally, prepared gels having a buffer with 10 mM to 50 mM threonine produced protein bands that were not shifted excessively far up the gel, as those with the 200 mM threonine in the gel buffer were. Moreover, as indicated by the arrows overlayed on FIG. 8, prepared gels having a buffer with 10 mM threonine produced protein bands that were sharper than those of the prepared gel with no threonine in the buffer. Therefore, these results indicate that a threonine concentration ranging from about 10 mM to about 50 mM achieves improved results for a gel buffer in a non-gradient polyacrylamide gel, wherein the gel buffer also includes Tris as an amine gel buffer and glycine as an ampholyte/trailing ion.

Example 9

This example illustrates the extended shelf life performance of four polyacrylamide gels within the scope of this disclosure. The series of four polyacrylamide gel formulations were cast in slab gel electrophoresis cassettes using aqueous acrylamide/bisacrylamide solutions with varied polyacrylamide concentrations for the resolving gel portion, of which the bisacrylamide constituted 2.6% of the monomer mixture (% C=2.6%). The gels included a non-gradient polyacrylamide gel with an 8% polyacrylamide concentration (% T=8%), a non-gradient polyacrylamide gel with a 10% polyacrylamide concentration (% T=10%), a gradient polyacrylamide gel with a 4-12% polyacrylamide concentration (% T=4-12%), and a gradient polyacrylamide gel with an 4-20% polyacrylamide concentration (% T=4-20%). Each of the four gels had a gel formulation of 75 mM Tris as a gel amine buffer, 125 mM glycine as a primary ampholyte, and 10 mM threonine as a conjugate ampholyte. The gels produced were 1 mm thick and about 8 cm long and about 8 cm wide. Each gel cassette was formed to have ten parallel lanes.

Each gel buffer was adjusted to the pH indicated in the descriptions below with 6N HCl. A sample buffer of 63 mM Tris HCl, 10% glycerol, 2% SDS, and 0.0025% bromophenol blue, having a at a pH of 6.8, was used with each gel formulation 100-107. A running buffer consisting of 25 mM Tris, 192 mM glycine, and 0.1% SDS, having a pH of 8.3, was used with each of the four gel formulations.

For each gel, all ten lanes were loaded with a sample protein mixture. The sample protein mixture loaded in each respective lane was the same for each prepared gel formulation. The sample protein mixtures loaded into the lanes 1-10 as identified in Table 5, except that the High Protein Load was loaded into different lanes of each gel for gel identification purposes.

TABLE 5

Identification of Sample Protein Mixtures Loaded in Lanes 1-10 for each gel tested in Experiment 9.

| Lane # | Sample | Amount |
|---|---|---|
| 1 | Mark12 ™ | 5 µL |
| 2 | High Protein Load | 3 µL |
| 3 | Mark12 ™ | 5 µL |
| 4 | 1X TG Sample Buffer | 5 µL |
| 5 | Mark12 ™ | 5 µL |
| 6 | PageRuler ™ or BenchMark ™ | 5 µL |
| 7 | Mark12 ™ | 5 µL |
| 8 | 1X TG Sample Buffer | 20 µL |
| 9 | 1X TG Sample Buffer | 10 µL |
| 10 | Mark12 ™ | 5 µL |

Ten of each of the four prepared gel formulations were made. Electrophoresis separation with the above identified samples was performed on one of each of the four prepared gel formulations on the day that the gels were made. Additionally, electrophoresis separation with the above identified samples was performed on one of each of the four prepared gel formulations at weekly intervals for up to 70 days after the gels were made, where the gels were stored at ambient, room temperature conditions during the period between when the gel was made and when electrophoresis separation was performed on the gel. By comparing separation performance of the stored gels to the performance of the gels tested on the day they were made, qualitative and quantitative analyses were used to assess when the stored gel failed to provided sufficient protein separation. All electrophoresis separations were performed at a constant voltage of 225V. The results are shown in Table 6.

TABLE 5

Identification of Sample Protein Mixtures Loaded in Lanes 1-10 for each gel tested in Experiment 9.

| Gel Type | Days to Failure While Stored at Room Temperature | Estimated Days to Failure While Stored at 4° C. |
|---|---|---|
| 8% TGT (T = 8%) | Not observed at 70 days | 354 |
| 10% TGT (T = 10%) | Not observed at 70 days | 380 |
| 4-12% TGT (T = 4-12%) | Not observed at 70 days | 588 |
| 4-20% TGT (T = 4-20%) | 56 days | 382 |

As can be seen with three of the gel formulations, failure to provide sufficient electrophoresis separation was not observed in the Tris-glycine-threonine (TGT) gels stored at room temperature after storage at room temperature for 70 days. For this experiment, failure was assessed as occurring based on the following: (1) a significant change in band migration after a set time of electrophoresis (i.e., migration), (2) loss of equal band migration across the width of the gel (i.e., straightness), (3) loss of band sharpness (i.e., splitting), and/or (4) significant slanting or sloping of low molecular weight bands (i.e., curvature). The prepared gel with a 4-20% polyacrylamide showed failure at 56 days. Known correlations between room temperature storage and 4° C. storage for similar polyacrylamide gel formulations were applied to the room temperature results of the four prepare gel formulations to arrive at predicted values for when such gel formulations will fail when stored under refrigerated conditions. Based on these estimations, it is anticipated that none of the four prepared gel formulations are expected to fail for at least about 12 months when stored at about 4° C. after they are made.

The above examples show that polyacrylamide gels having a gel formulation that includes Tris as a gel amine buffer, glycine as a primary ampholyte, and threonine or serine as a conjugate ampholyte may provide desirable electrophoresis separation of macromolecules, such as proteins. The examples further demonstrate that a Tris concentration below about 150 mM, or ranging from about 70 mM to about 140 mM, or ranging from about 70 mM to about 80 mM may be desirable; that a glycine concentration ranging from about 25 mM to about 250, or ranging from about 100 mM to about 250 mM may be desirable; that a threonine or serine concentration ranging from about 0.1 mM to about 50 mM, a threonine or serine concentration ranging from about 10 mM to about 50 mM, or ranging from about 10 mM to about 20 mM may be desirable; and that an approximately neutral pH ranging from about 6.5 to about 7.5, an approximately neutral pH ranging from about 6.9 to about 7.5, an approximately neutral pH ranging from about 7.0 to about 7.2, or a pH of about 7.1 may be desirable. Additionally, the examples demonstrate electrophoresis can be performed on gels having the above recited gel formulations about 12 months after the gels are manufactured, where the gels are stored under refrigerated conditions of about 4° C.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the written description and claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

It is noted that, as used in this specification and the appended claims, the singular forms "a," "an," and "the," include plural referents unless expressly and unequivocally limited to one referent. As used herein, the term "include" and its grammatical variants are intended to be non-limiting, such that recitation of items in a list is not to the exclusion of other like items that can be substituted or added to the listed items.

It will be apparent to those skilled in the art that various modifications and variations can be made to the compositions and methods of the present disclosure without departing from the scope of its teachings. Other embodiments of the disclosure will be apparent to those skilled in the art from consideration of the specification and practice of the teachings disclosed herein. It is intended that the specification and embodiment described herein be considered as exemplary only.

What is claimed is:

1. A gel for gel electrophoresis, comprising:
   a polyacrylamide gel consisting of an aqueous solution of acrylamide, an aqueous solution of bis-acrylamide and an initiator;
   a gel buffer comprising:
      a gel amine buffer wherein the gel amine buffer is selected from bis(2-hydroxyethyl)-amino-tris(hydroxymethyl)-methane, 1,3-bis(tris(hydroxymethyl)methylamino)propane, and tris(hydroxymethyl)aminomethane, having a concentration range of from about 40 mM to about 150 mM;
      a primary gel ampholyte; and
      a conjugate gel ampholyte, wherein the conjugate gel ampholyte is threonine.

2. The polyacrylamide gel of claim 1, wherein the gel amine buffer further comprises triethanolamine.

3. The polyacrylamide gel of claim 1, wherein the gel amine buffer is tris(hydroxymethyl)aminomethane.

4. The polyacrylamide gel of claim 1, wherein the primary gel ampholyte is selected from glycine and tricine.

5. The polyacrylamide gel of claim 1, wherein the primary gel ampholyte is glycine.

6. The polyacrylamide gel of claim 1, wherein the conjugate gel ampholyte further comprises serine.

7. The polyacrylamide gel of claim 1, wherein the concentration of the gel amine buffer is less than about 150 mM.

8. The polyacrylamide gel of claim 1, wherein the concentration of the gel amine buffer ranges from about 40 mM to about 150 mM.

9. The polyacrylamide gel of claim 1, wherein the concentration of the gel amine buffer ranges from about 70 mM to about 140 mM.

10. The polyacrylamide gel of claim 1, wherein the concentration of the gel amine buffer ranges from about 70 mM to about 80 mM.

11. The polyacrylamide gel of claim 1, wherein the concentration of the primary gel ampholyte ranges from about 25 mM to about 250 mM.

12. The polyacrylamide gel of claim 1, wherein the concentration of the primary gel ampholyte ranges from about 100 mM to about 250 mM.

13. The polyacrylamide gel of claim 1, wherein the concentration of the conjugate gel ampholyte ranges from about 10 mM to about 20 mM.

14. The polyacrylamide gel of claim 1, wherein the concentration of the conjugate gel ampholyte ranges from about 0.1 mM to about 50 mM or from about 10 mM to about 50 mM.

15. The polyacrylamide gel of claim 1, wherein the pH of the gel buffer ranges from about 6.5 to about 7.5, or from about 6.75 to about 7.25, or is about 7.0.

16. The polyacrylamide gel of claim 1, wherein the pH of the gel buffer ranges from about 6.5 to about 7.5, or from about 6.9 to about 7.5, or from about 7.0 to about 7.2, or is about 7.1.

17. The polyacrylamide gel of claim 1, formulated to have a shelf life of at least about 6 months, at least about 8 months, at least about 10 months, or, when stored at about 4° C., at least about 12 months, or up to about 24 months, at least about 18 months, at least about 16 months, at least about 14 months, at least about 12 months, at least about 10 months, at least about 8 months, or up to about 6 months.

18. The polyacrylamide gel of claim 1, wherein the pKa of the gel amine buffer ranges of from about 5 to about 10, or from about 5.5 to about 10, or from about 6 to about 9, or from about 7 to about 8.5, or from about 7.9 to about 8.2, or from about 8 to about 8.1, or from about 7.9 to about 9.8, or the pKa of the gel amine buffer is about 8.1.

19. A method for separating molecules in a sample by electrophoresis, the method comprising:
   forming a polyacrylamide gel consisting of an aqueous solution of acrylamide, and an aqueous solution of bis-acrylamide and an initiator;
   loading the polyacrylamide gel with the sample; and
   imposing a voltage differential across the gel to cause the molecules to migrate through said gel at migration rates that vary with mass and/or charge,
   wherein the gel buffer comprises:
      a gel amine buffer wherein the gel amine buffer is selected from bis(2-hydroxyethyl)-amino-tris(hydroxymethyl)-methane, 1,3-bis(tris(hydroxymethyl)methylamino)propane, and tris(hydroxymethyl)aminomethane, wherein the concentration of bis(2-hydroxyethyl)-amino-tris(hydroxymethyl)-methane, 1,3-bis(tris(hydroxymethyl)methylamino)propane or tris(hydroxymethyl)aminomethane ranges from about 40 mM to about 150 mM and can further comprise triethanolamine;
      a primary gel ampholyte; and
      a conjugate gel ampholyte comprising threonine.

20. The method of claim 19, wherein the gel amine buffer is tris(hydroxymethyl)aminomethane, the primary gel ampholyte is glycine, and the conjugate gel ampholyte is threonine.

21. The method of claim 19, wherein the concentration of the gel amine buffer in the polyacrylamide gel is less than about 150 mM.

22. The method of claim 19, wherein the molecules are proteins.

23. The method of claim 19, further comprising storing the polyacrylamide gel under refrigeration for a period of time of up to about 24 months, up to about 18 months, up to about 16 months, up to about 14 months, up to about 12 months, up to about 10 months, up to about 8 months or up to about 6 months after the forming step and before the loading step.

24. A gel buffer for a polyacrylamide gel consisting of an aqueous solution of acrylamide, an aqueous solution of bis-acrylamide and an initiator, the gel buffer comprising:

a gel amine buffer;

a primary gel ampholyte wherein the gel amine buffer is selected from bis(2-hydroxyethyl)-amino-tris(hydroxymethyl)-methane, 1,3-bis(tris(hydroxymethyl)methylamino)propane, and tris(hydroxymethyl)aminomethane, wherein the concentration of bis(2-hydroxyethyl)-amino-tris(hydroxymethyl)-methane, 1,3-bis(tris(hydroxymethyl)methylamino)propane or tris(hydroxymethyl)aminomethane ranges from about 40 mM to about 150 mM; and a conjugate gel ampholyte comprising threonine;

wherein the pH of the gel amine buffer ranges from about 6.9 to about 7.5.

* * * * *

UNITED STATES PATENT AND TRADEMARK OFFICE
CERTIFICATE OF CORRECTION

PATENT NO.         : 10,983,090 B2
APPLICATION NO.    : 15/294625
DATED              : April 20, 2021
INVENTOR(S)        : Thacker et al.

Page 1 of 1

It is certified that error appears in the above-identified patent and that said Letters Patent is hereby corrected as shown below:

In the Claims

Column 24, Claim 19, Line 37, please delete the "and" before "an aqueous solution....".

Signed and Sealed this
Seventh Day of September, 2021

Drew Hirshfeld
*Performing the Functions and Duties of the*
*Under Secretary of Commerce for Intellectual Property and*
*Director of the United States Patent and Trademark Office*